US010708507B1

(12) United States Patent
Dawson et al.

(10) Patent No.: US 10,708,507 B1
(45) Date of Patent: Jul. 7, 2020

(54) AUTOMATED CONTROL OF IMAGE ACQUISITION VIA USE OF ACQUISITION DEVICE SENSORS

(71) Applicant: Zillow Group, Inc., Seattle, WA (US)

(72) Inventors: Mitchell David Dawson, Redmond, WA (US); Li Guan, Bellevue, WA (US); Andrew H. Otwell, Seattle, WA (US); Dun-Yu Hsiao, Bellevue, WA (US)

(73) Assignee: Zillow Group, Inc., Seattle, WA (US)

( * ) Notice: Subject to any disclaimer, the term of this patent is extended or adjusted under 35 U.S.C. 154(b) by 0 days.

(21) Appl. No.: 16/236,187

(22) Filed: Dec. 28, 2018

Related U.S. Application Data

(60) Provisional application No. 62/744,480, filed on Oct. 11, 2018.

(51) Int. Cl.
*H04N 5/232* (2006.01)
*G06F 1/16* (2006.01)

(52) U.S. Cl.
CPC ..... *H04N 5/232945* (2018.08); *G06F 1/1694* (2013.01); *H04N 5/23238* (2013.01)

(58) Field of Classification Search
CPC .......... H04N 5/232945; H04N 5/23238; G06F 1/1694; G06T 2200/32; G02B 13/06; G02B 37/00–06
See application file for complete search history.

(56) References Cited

U.S. PATENT DOCUMENTS 5,140,352 A    8/1992  Moore et al.
6,031,540 A    2/2000  Golin et al.
(Continued)

FOREIGN PATENT DOCUMENTS

EP    2413097 A2    2/2012
EP    2505961 A2    10/2012
(Continued)

OTHER PUBLICATIONS

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
(Continued)

*Primary Examiner* — Yogesh K Aggarwal
(74) *Attorney, Agent, or Firm* — VLP Law Group LLP; James A. D. White

(57) ABSTRACT

Techniques are described for using computing devices to perform automated operations to control acquisition of images in a defined area, including obtaining and using data from one or more hardware sensors on a mobile device that is acquiring the images, analyzing the sensor data (e.g., in a real-time manner) to determine the geometric orientation of the mobile device in three-dimensional (3D) space, and using that determined orientation to control the acquisition of further images by the mobile device. In some situations, the determined orientation information may be used in part to automatically generate and display a corresponding GUI (graphical user interface) that is overlaid on and augments displayed images of the environment surrounding the mobile device during the image acquisition process, so as to control the mobile device's geometric orientation in 3D space.

25 Claims, 18 Drawing Sheets

(56) References Cited

U.S. PATENT DOCUMENTS

| | | |
|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Bidder et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,395,435 B2 | 8/2019 | Powers et al. |
| 2006/0256109 A1* | 11/2006 | Acker .................. G06T 15/20 345/419 |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1* | 2/2013 | Brinda .................. G03B 37/02 348/38 |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hoyden et al. |

(56) References Cited

U.S. PATENT DOCUMENTS

| | | |
|---|---|---|
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016/154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23 2018, 9 pages.

Lee et al. "RoomNet: End-to-End Room Layout Estimation" in arXiv:1703.00241v2, submitted Aug. 7, 2017, 10 pages.

Tme-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

CubiCasa | From video to floor plan in under 5 minutes, retrieved on Mar. 26, 2019, from https://www.cubi.casa/, 6 pages.

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

Guide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

Staging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "Flow to Make a 3-D Model of Your Home Renovation Vision," in The New York Times, Feb. 13, 2019, retrieved Mar. 28, 2019, 6 pages.

* cited by examiner

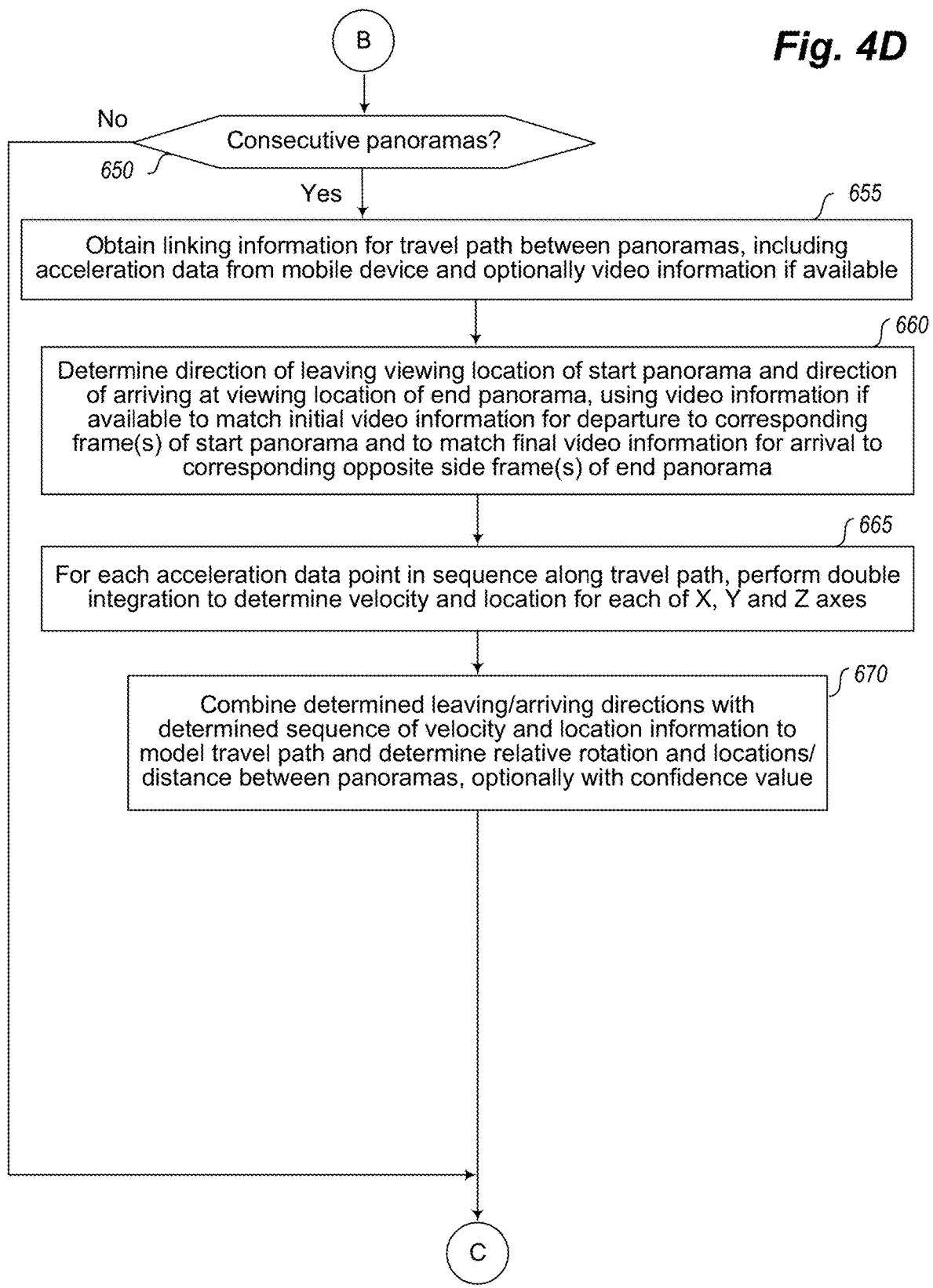

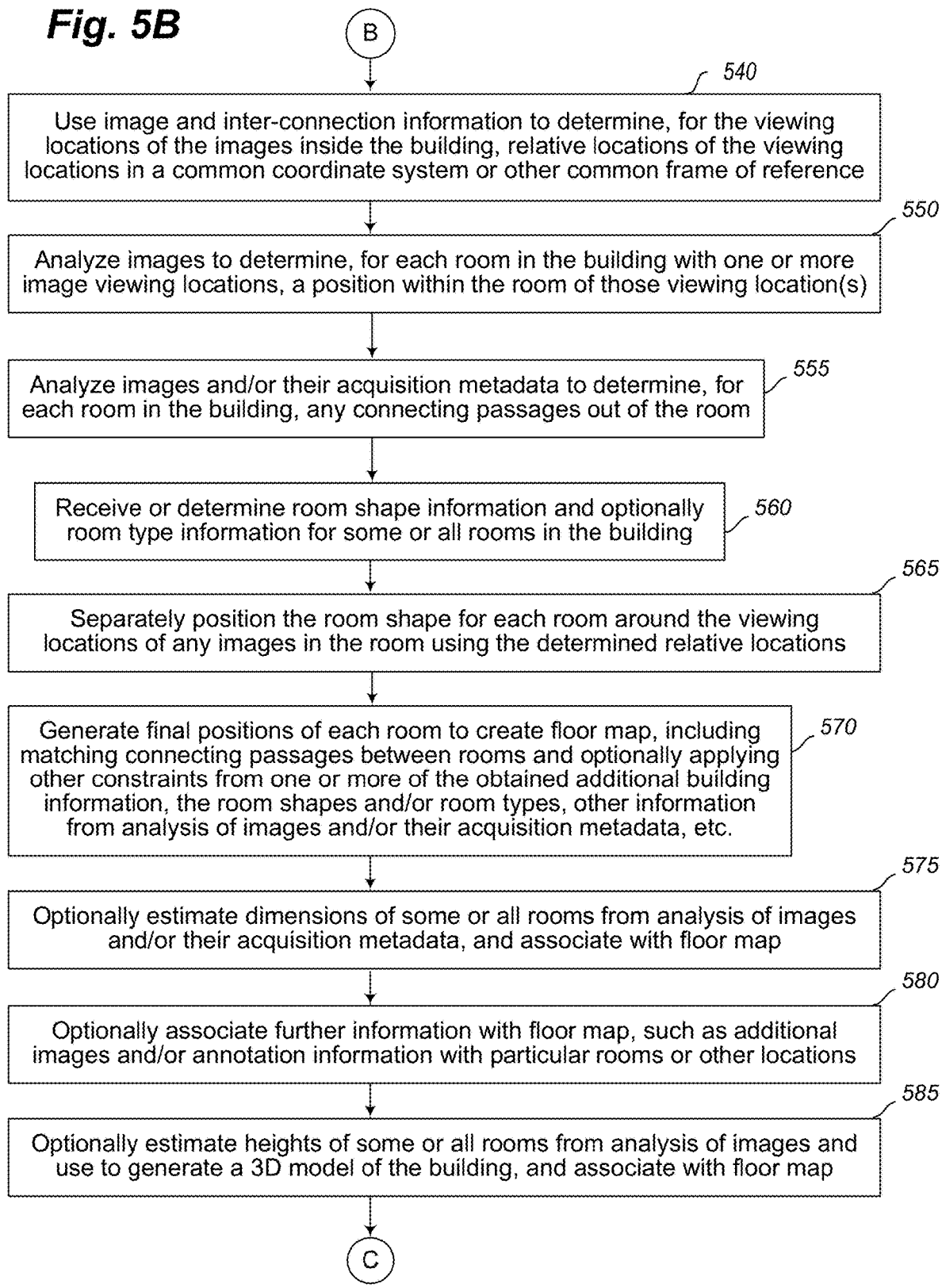

AUTOMATED CONTROL OF IMAGE ACQUISITION VIA USE OF ACQUISITION DEVICE SENSORS

CROSS REFERENCE TO RELATED APPLICATIONS

This application claims the benefit of U.S. Provisional Patent Application No. 62/744,480, filed Oct. 11, 2018 and entitled "Automated Control Of Image Acquisition Via Use Of Acquisition Device Sensors," which is hereby incorporated by reference in its entirety.

TECHNICAL FIELD

The following disclosure relates generally to techniques for automatically controlling acquisition of images in a defined area for use in generating mapping information for the area, as well as for subsequently using the generated mapping information in one or more manners, such as by real-time analysis and use of sensor data on a mobile device that acquires the images.

BACKGROUND

In various fields and circumstances, such as architectural analysis, property inspection, real estate acquisition and development, general contracting, improvement cost estimation and other circumstances, it may be desirable to view the interior of a house, office, or other building without having to physically travel to and enter the building. However, it can be difficult or impossible to effectively capture visual information within building interiors without using specialized equipment, as well as to display visual information captured within building interiors to users at remote locations, such as to enable a user to fully understand the layout and other details of the interior and to control the display in a user-selected manner.

BRIEF DESCRIPTION OF THE DRAWINGS

FIGS. 4A-4D illustrate an example embodiment of a flow diagram for an Image Capture and Analysis (ICA) system routine in accordance with an embodiment of the present disclosure.

FIGS. 5A-5B illustrate an example embodiment of a flow diagram for a Mapping Information Generation Manager (MIGM) system routine in accordance with an embodiment of the present disclosure.

DETAILED DESCRIPTION

Figure 1A:
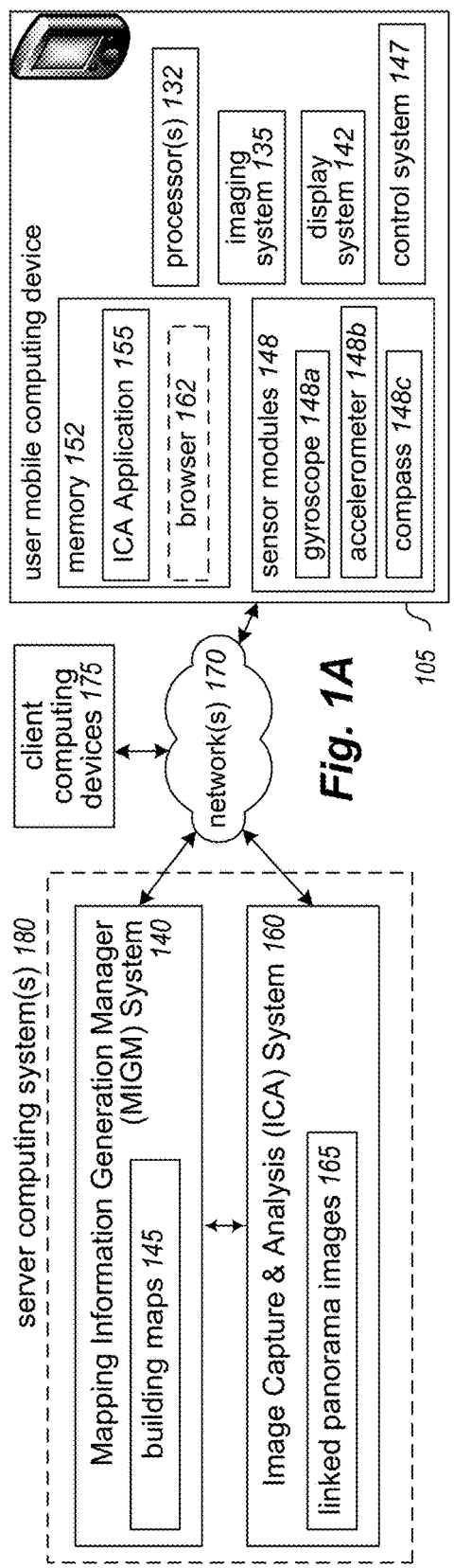
FIGS. 1A-1D are diagrams depicting an exemplary building interior environment and computing system(s) for use in embodiments of the present disclosure, including to generate and present information representing the building interior.

The present disclosure describes techniques for using computing devices to perform automated operations to control acquisition of images in a defined area, as well as techniques for further automated operations to subsequently generate and use mapping information from the acquired images in one or more further manners. In at least some embodiments, the automated control of the image acquisition includes obtaining and using data from one or more hardware sensors on a handheld mobile device that is acquiring the images, analyzing the sensor data (e.g., in a real-time manner) to determine the geometric orientation of the mobile device in three-dimensional (3D) space (e.g., with respect to 3 degrees of rotational freedom, referred to as pitch, roll and yaw, or swivel, tilt and pivot), and using that determined orientation to control the acquisition of further images by the mobile device. In some such embodiments, the handheld mobile device may be carried by a user to multiple viewing locations within the defined area (e.g., within a building or other structure) and used to acquire a panorama image (or other information) at each such viewing location, by the user turning his or her body in a full or partial circle at that viewing location while the images are acquired, and with the determined orientation information corresponding to an outward direction of the mobile device's camera or other imaging sensors and being used in part to automatically generate and display a corresponding GUI (graphical user interface) that is overlaid on and augments displayed images of the environment surrounding the mobile device during the image acquisition process, so as to control the mobile device's geometric orientation in 3D space by guiding the placement of the mobile device for acquisition (or re-acquisition) of images at defined orientations from the viewing location that satisfy one or more defined criteria. Additional details are included below regarding the automated control of the image acquisition using sensor data of the acquiring mobile device, and some or all of the corresponding techniques described herein may, in at least some embodiments, be performed via automated operations of an Interior Capture and Analysis ("ICA") system, as discussed further below.

As noted above, the images acquired from a multi-room building (or other structure) may be used in various manners in various embodiments, optionally along with additional metadata information obtained during the image acquisition, including to further generate and use mapping information for the building or other structure. For example, if the defined area is an interior of a multi-room building (e.g., a house, office, etc.), the generated information may include a floor map of the building, and/or multiple inter-connected panorama images or other images acquired at various viewing locations within the building. Such a generated floor map and/or other generated mapping-related information may be further used in various manners in various embodiments, including for controlling navigation of other devices (e.g., autonomous vehicles), for display on one or more client devices in corresponding GUIs (graphical user interfaces), etc. Additional details are included below regarding the automated generation and use of mapping information, and some or all of the corresponding techniques described herein may, in at least some embodiments, be performed via automated operations of a Mapping Information Generation Manager ("MIGM") system, as discussed further below.

In at least some embodiments and situations, some or all of the images acquired for a building (or other structure) may be panorama images that are each acquired at one of multiple viewing locations in or around the building, such as to optionally generate a panorama image at a viewing location from a video at that viewing location (e.g., a 360° video taken from a smartphone or other mobile device held by a user turning at that viewing location), from multiple images acquired in multiple directions/orientations from the viewing location (e.g., from a smartphone or other mobile device held by a user turning at that viewing location), etc. It will be appreciated that such a panorama image may in some situations be represented in a spherical coordinate system and cover up to 360° around horizontal and/or vertical axes, such that an end user viewing a panorama image may move the viewing direction within the panorama image to different directions to cause different images (or "views") to be rendered within the panorama image (including, if the panorama image is represented in a spherical coordinate system, to convert the image being rendered into a planar coordinate system). Furthermore, acquisition metadata regarding the capture of such panorama images may be obtained and used in various manners, such as data acquired from IMU (inertial measurement unit) sensors (e.g., one or more accelerometers, gyroscopes, compasses, etc.) or other sensors (e.g., imaging sensors) of a mobile device as it is carried by a user or otherwise moved between viewing locations.

As noted above, in at least some embodiments, the automated control of the image acquisition includes displaying a GUI that is overlaid on images acquired from a camera or other imaging system of a handheld mobile device as a user rotates around a vertical axis at a viewing location, with the GUI including visual indicators based on the mobile device's current position in 3D space (geometric orientation with respect to tilt, pivot and swivel; and optionally location translation along a vertical axis and perpendicular horizontal axes, such as with respect a viewing location or other defined location in 3D space; and also referred to herein more generally as "orientation" and optionally "location")— as used herein, the term "position" corresponds to such 3D geometric orientation and optionally location, unless otherwise indicated. In at least some embodiments, the display and updating of the GUI is performed in a continuous or substantially continuous manner as the user turns, to provide real-time or near-real-time feedback based on data being acquired from the mobile device's IMU hardware sensors and/or other hardware sensors (e.g., with the displayed GUI visually showing the mobile device's current position within a period of time from the hardware sensor data availability that is measured in at least one of microseconds, milliseconds, hundredths of a second, tenths of a second, a second, etc.). Thus, as a display on the mobile device (or other device available to the user) shows the images available from the mobile device's imaging sensor(s), whether the images are being automatically saved or not (e.g., as continuous video), the display overlaid on the images includes information that is sufficiently current to allow the user to modify the position of the mobile device if the current position differs from the target positions in 3D space (target geometric orientations, and optionally target locations) at which to acquire and save images by an amount that exceeds a defined threshold. Additional details are included below related to determining a mobile device's current position in 3D space using data from hardware sensors on the mobile device.

The form of the displayed GUI, and its contents, may include various displayed icons or other elements in various embodiments, including user-selectable controls and instructional text or other visual indicators. In at least some embodiments, the displayed elements of the GUI include one or more visual indicators of the mobile device's current position, such as in the center of the underlying displayed image in some embodiments—examples of such visual current position indicators may include an icon representing a smartphone or other mobile device, a crosshairs or other combination of at least one horizontal and/or vertical line (e.g., in a manner similar to an attitude indicator in an airplane's flight instruments), multiple horizontal lines (e.g., above and below the current position), multiple vertical lines (e.g., to the right and left of the current position), etc. In addition, in at least some embodiments, target positions for some or all acquired and saved images may further be shown in the displayed GUI (e.g., for all such target positions visible in the current image), such as to provide feedback regarding previous acquisitions that have occurred—in some embodiments, such visual indicators of previous target positions may further include visual indications of the success or failure of the image acquisition (e.g., one or more degrees of quality), such as via colors, patterns and/or other visual indications. Furthermore, in at least some embodiments, the displayed elements of the GUI include one or more visual target position indicators that are displayed at locations in the image corresponding to real-world 3D positions at which images are to be acquired and saved— such displayed visual target position indicators may include, for example, one or more indicators for a current image to be acquired and saved, one or more indicators for a next image to be acquired and saved after the current image, etc., and optionally to include indicators for all target positions that are known at a time of display and visible in the current image being displayed. It will be appreciated that as a mobile device's position changes and the corresponding images visible from the device's imaging sensor change, the displayed GUI will similarly be updated, even if no images are acquired and saved during those changes. Furthermore, if images are not successfully acquired and saved for one or more missed target positions, the displayed GUI may further generate and display instructions related to correcting the situation, such as for the user to change the direction of rotation (go backwards) to reacquire and save images for such missed target positions—such missed target positions may be caused by various factors, such as the mobile device position not successfully matching the target position (e.g., with respect to one or more of the six degrees of rotation for the mobile device), the mobile device being turned too fast (to cause a blurry image) or otherwise not acquiring an image of sufficient quality (e.g., lighting is too low, an intervening objects blocks some or all of the building interior to be acquired, etc.). In some embodiments, if the mobile device is pivoted around a horizontal axis such that the right and left sides of the device are at different heights (resulting in images that skewed with respect to level), the image and visual target position indicators will be displayed in such a skewed manner while the visual current position indicator is in the image center and level—in other embodiments in such a situation, the image and visual target position indicators will be adjusted to be shown as being level, while the location and/or skew of the mobile device's visual current position indicator may be changed on the displayed image. In yet other embodiments, no visual target position indicators may be displayed. Additional details are included below related to displayed GUIs that may be used in various embodiments, such as to display determined acquisition device 3D position (e.g., orientation), including in the examples discussed with respect to FIGS. 2A-2I.

The described techniques provide various benefits in various embodiments, including to acquire images from a viewing location with greater accuracy and with greater speed relative to previously existing techniques, based at least in part on acquiring images that are at defined positions (e.g., orientations) from viewing locations and that may satisfy additional defined criteria, including via use of handheld mobile devices that provide various benefits over other image acquisition devices that are fixed at a particular height and/or location (e.g., benefits with respect to dynamic correction of image acquisition via instructions to a human user holding the handheld mobile device, device availability and cost, etc.). Such described techniques provide further benefits in using such acquired images to generate corresponding mapping information for buildings or other locations at which the images are acquired, including enabling improved automated navigation of a building by mobile devices (e.g., semi-autonomous or fully-autonomous vehicles), so as to significantly reduce their computing power and time used to attempt to otherwise learn a building's layout, as well as to provide improved GUIs in which other end users may more accurately and quickly obtain information about a building's interior (e.g., for use in navigating that interior). Various other benefits are also provided by the described techniques, some of which are further described elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while specific types of GUIs are used in specific manners in specific examples, it will be appreciated that other types of GUIs may be used in the manners discussed herein. In addition, while GUIs are generated using specific types of data in specific examples, including data from IMU sensors on a smartphone or other mobile device, it will be appreciated that the same or similar GUIs may be generated and used in other manners in other embodiments, including based on other types of data (e.g., from a camera on a smartphone or other mobile device). In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. As used herein, the term "panorama image" refers to any visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of viewing locations, as used herein, refers generally to two or more viewing locations that are each visited at least once in a corresponding order, whether or not other non-viewing locations are visited between them, and whether or not the visits to the viewing locations occur during a single continuous period of time or at multiple different time periods. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1A is an example block diagram of various computing devices and systems that may participate in the described techniques in some embodiments. In particular, one or more panorama images 165 may be individually generated and then inter-connected (or "linked") under control of an ICA system 160 that is executing on one or more server computing systems 180 in this example, such as with respect to one or more buildings or other structures. In particular, in each such building or other structure, one or more users (not shown) may carry one or more mobile devices, such as a user mobile computing device 105, to multiple viewing locations within the building or other structure, and use functionality of the ICA system to automatically control at least some of the acquisition of panorama images (or other information) at each such viewing location—as part of the automated operations of the ICA system, it may obtain various sensor data (e.g., IMU sensor data) from a user mobile device, and analyze the sensor data to monitor and control the image acquisition process for that user mobile device, including to generate and modify a GUI to guide the user actions during the image acquisition process (e.g., to control the mobile device's position in 3D space, such as with respect to geometric orientation and optionally location). In some embodiments, a mobile device 105 may include a browser 162 and/or an ICA application 155 specific to the ICA system that execute in memory 152 of the device 105 by processor 132 and interact over one or more networks 170 with a remote executing ICA system 160, while in other embodiments some or all such mobile devices 105 may instead locally execute a copy of some or all of the ICA system (not shown in FIG. 1A) in their local memory 152 that automatically controls some or all of the image acquisition activities for that device 105.

Figure 1B:
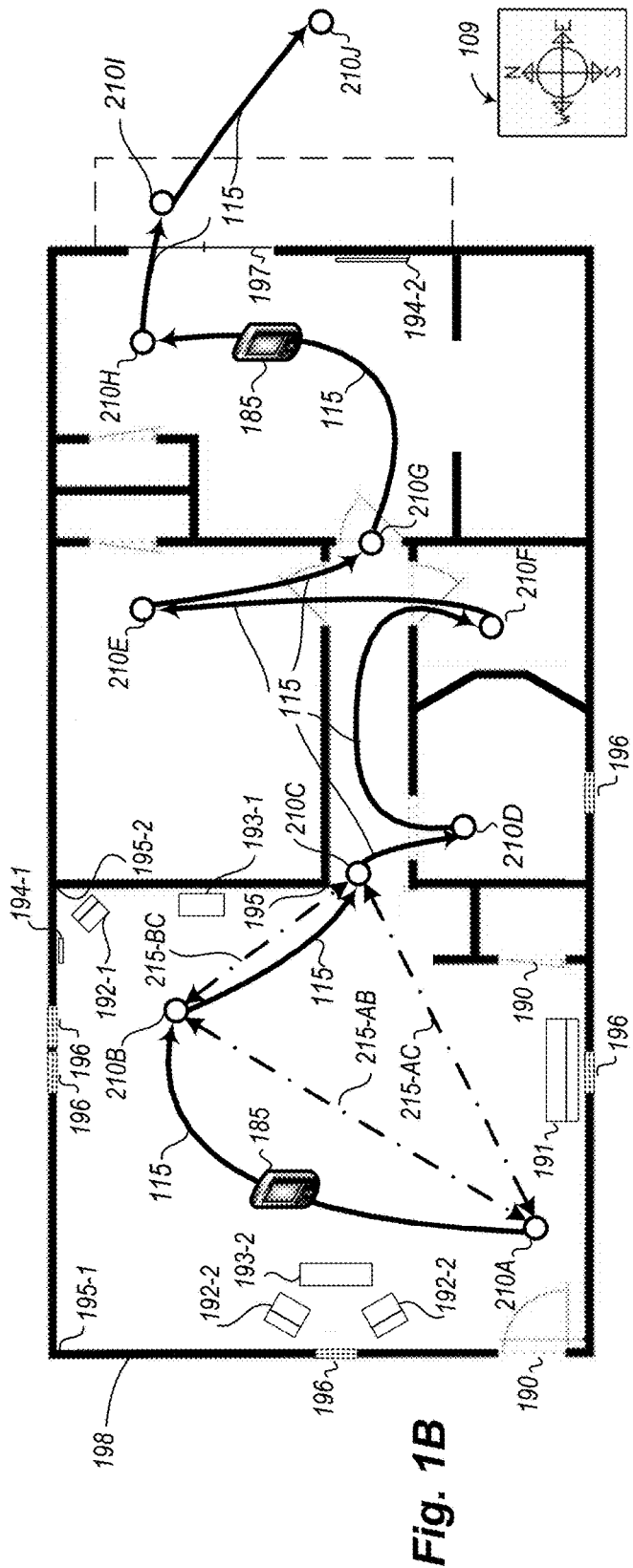
Figure 1C:
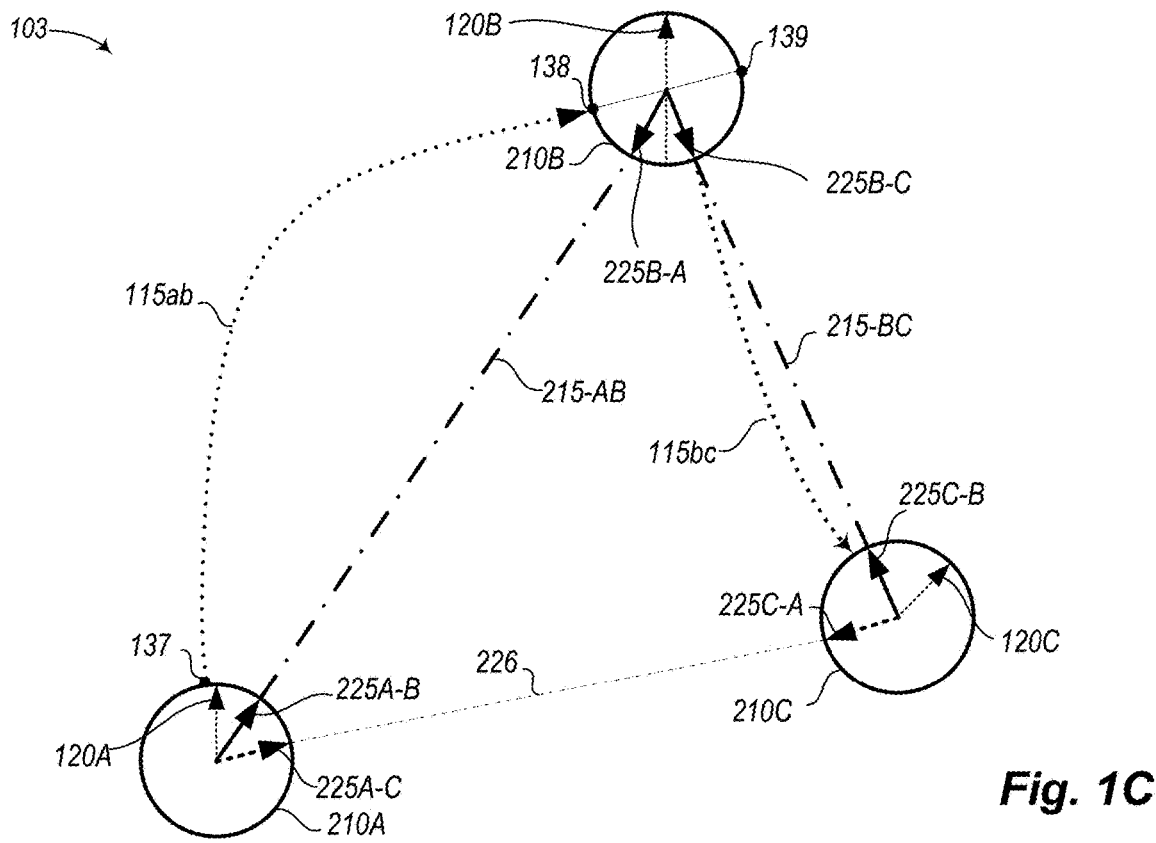
Figure 1D:
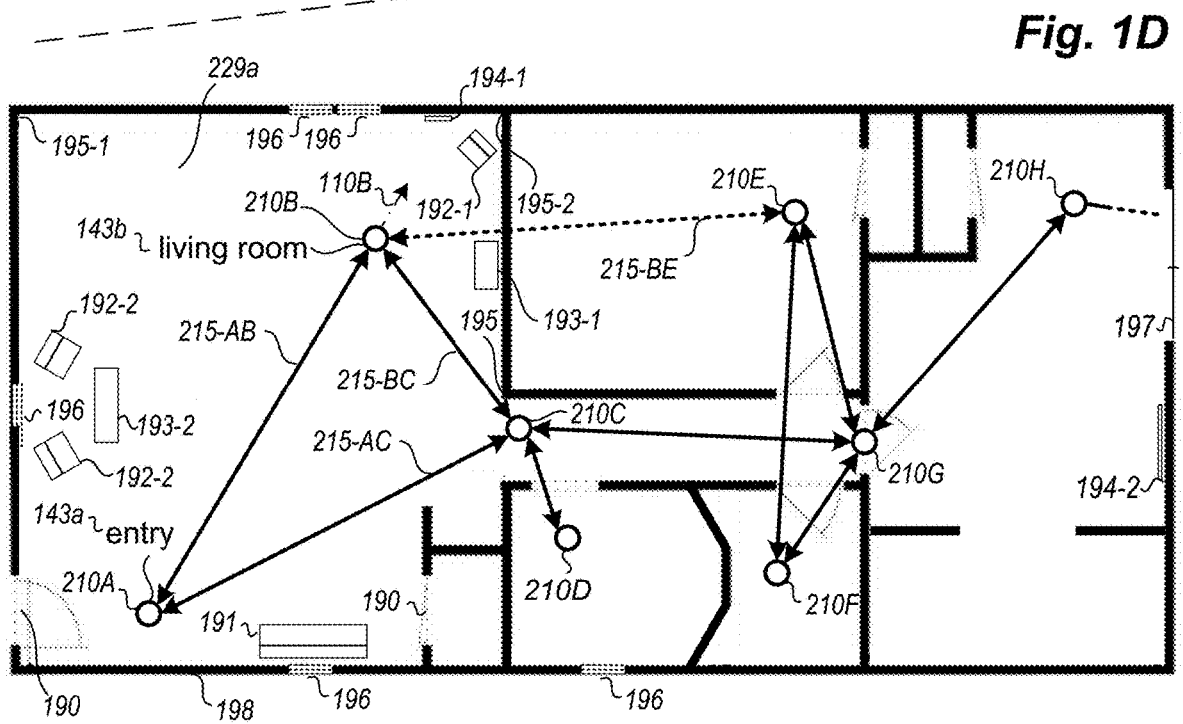

In operation, a copy of the ICA system may obtain information from one or more hardware sensors on a particular mobile device, such as to interact with one or more sensor modules 148 on mobile device 105 that include a gyroscope 148a, accelerometer 148b and compass 148c in this example (e.g., as part of one or more IMU units, not shown separately, on the mobile device), and optionally a GPS (or Global Positioning System) sensor or other position determination sensor (not shown in this example). The ICA system may then analyze the information to determine the mobile device's 3D geometric orientation, and in some cases 3D location (e.g., if combined with additional information, such as from a camera or other imaging sensor of the imaging system 135), and use such device position information to control further image acquisition. As part of controlling the further acquisition, the ICA system may obtain information about at least one next defined target position (orientation and optionally location) from the current viewing location for which to acquire and save one or more next images, and generate a corresponding GUI (optionally by updating a previously generated and displayed GUI) that is shown on the display system 142 of the mobile device 105. As discussed in greater detail elsewhere herein, the GUI may be overlaid on an image that is currently visible from the imaging system 135, such as with a device current position indicator displayed in the center of the image (or optionally other location) to represent the current position of the mobile device, and to allow the user to manipulate the position of the mobile device so that the displayed current position indicator matches one or more displayed visual target indicators in the displayed GUI of the next target position at which the next image is to be acquired. In at least some embodiments, when the current and target positions match, the ICA system may further automatically acquire and save one or more images using the imaging system 135 from that position, while in other embodiments the system may note one or more current frames for that position if video is being continuously acquired and saved. Various other types of information may also be displayed as part of such a GUI and/or otherwise presented by the mobile device (e.g., sounds via speakers), as discussed further below, and FIGS. 2A-2I illustrate further details about the automated control of the image acquisition activities, as discussed further below. In addition, FIG. 1B shows one example of acquiring such panorama images for a particular house, and FIGS. 1C-1D provide further examples of linking such panorama images, as is also discussed further below.

An MIGM (Mapping Information Generation Manager) system 140 is further illustrated in FIG. 1A as executing on one or more server computing systems to generate and provide building floor maps 145 and/or other mapping-related information (not shown) based on use of the linked panorama images 165 and optionally associated metadata about their acquisition and linking. In some embodiments, the ICA system 160 and MIGM system 140 may execute on the same server computing system(s), such as if both systems are operated by a single entity or are otherwise executed in coordination with each other (e.g., with some or all functionality of both systems integrated together into a larger system), while in other embodiments the MIGM system may instead obtain linked panorama images (or other information) from one or more external sources and optionally store them locally (not shown) with the MIGM system for further analysis and use. In yet other embodiments, the ICA system may operate without interactions with such an MIGM system or without use of its functionality.

One or more end users (not shown, and in at least some cases different from the image acquiring user(s) who are using the mobile devices 105) of one or more client computing devices 175 may further interact over one or more computer networks 170 with the MIGM system 140 and/or the ICA system 160, such as to obtain, display and interact with a generated floor map and/or one or more associated linked panorama images (e.g., to change between a floor map view and a view of a particular panorama image at a viewing location within or near the floor map; to change the horizontal and/or vertical viewing direction from which a corresponding view of a panorama image is displayed, such as to determine a portion of a panorama image in a 3D spherical coordinate system to which a current user viewing direction is directed, and to render a corresponding planar image that illustrates that portion of the panorama image without the curvature or other distortions present in the original panorama image; etc.). In addition, while not illustrated in FIG. 1A, in some embodiments the client computing devices 175 (or other devices, not shown), may receive and use generated floor maps and/or other generated mapping-related information in additional manners, such as to control or assist automated navigation activities by those devices (e.g., by autonomous vehicles or other devices), whether instead of or in addition to display of the generated information.

In the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the user mobile computing devices may include other components and stored information (e.g., acquired images, image acquisition metadata, linking information, etc.) that are not illustrated, and the client computing devices 175 and server computing systems 180 may similarly include various hardware components and stored information, as discussed in greater detail below with respect to FIG. 3.

As part of the acquisition and generation of multiple panorama images at multiple associated viewing locations (e.g., in multiple rooms or other locations within a building or other structure and optionally around some or all of the exterior of the building or other structure), such as for use in generating and providing a representation of an interior of the building or other structure, ICA system 160 may perform further automated operations involved in such activities. For example, in at least some such embodiments, such techniques may include using one or more mobile devices 105 (e.g., a smart phone held by a user, a camera held by or mounted on a user or the user's clothing, etc.) to capture visual data from a sequence of multiple viewing locations (e.g., video captured continuously at each viewing location while a mobile device is rotated for some or all of a full 360 degree rotation at that viewing location, a series of individual images acquired in a non-continuous manner, etc.) within multiple rooms of a house (or other building), and to further capture data linking the multiple viewing locations, but without having distances between the viewing locations being measured or having other measured depth information to objects in an environment around the viewing locations (e.g., without using any depth-sensing sensors separate from the camera). After the viewing locations' videos and linking information are captured, the techniques may include analyzing video captured at each viewing location to create a panorama image from that viewing location that has visual data in multiple directions (e.g., a 360 degree panorama around a vertical axis), analyzing information to determine relative positions/directions between each of two or more viewing locations, creating inter-panorama positional/directional links in the panoramas to each of one or more other panoramas based on such determined positions/directions, and then providing information to display or otherwise present multiple linked panorama images for the various viewing locations within the house. Additional details related to embodiments of a system providing at least some such functionality of an ICA system are included in each of the following: co-pending U.S. Non-Provisional patent application Ser. No. 15/649,434, filed Jul. 13, 2017 and entitled "Connecting And Using Building Interior Data Acquired From Mobile Devices" (which includes disclosure of an example BICA system that is generally directed to obtaining and using panorama images from within one or more buildings or other structures); U.S. Non-Provisional patent application Ser. No. 15/950,881, filed Apr. 11, 2018 and entitled "Presenting Image Transition Sequences Between Viewing Locations" (which includes disclosure of an example ICA system that is generally directed to obtaining and using panorama images from within one or more buildings or other structures, as well as an example ILTM system that is generally directed to determining and/or presenting transition sequences between different panorama images or other images); and U.S. Non-Provisional Patent application Ser. No. 16/190,162, filed Nov. 14, 2018 and entitled "Automated Mapping Information Generation From Inter-Connected Images" (which includes disclosure of an example ICA system that is generally directed to obtaining and using panorama images from within one or more buildings or other structures, as well as an example FMGM system that is generally directed to determining and/or presenting floor maps and/or other representations of buildings or other structures using multiple captured panorama images or other images for those structures); each of which is incorporated herein by reference in its entirety.

FIG. 1B depicts a block diagram of an exemplary building interior environment in which linked panorama images will be generated and subsequently used. In particular, FIG. 1B includes a building 198 with an interior to be captured at least in part via multiple panorama images, such as by a user (not shown) carrying a mobile device 185 with image acquisition capabilities as it is moved through the building interior along a travel path 115 to a sequence of multiple viewing locations 210. An embodiment of the ICA system (e.g., ICA system 160 on server computing system(s) 180, a copy of some or all of the ICA system executing on the user's mobile device, etc.) may automatically perform or assist in the capturing of the data representing the building interior, as well as further analyze the captured data to generate linked panorama images providing a visual representation of the building interior. While the mobile device of the user may include various hardware components, such as a camera, one or more hardware sensors (e.g., a gyroscope, an accelerometer, a compass, etc., such as part of one or more IMUs of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their viewing locations may be determined in part or in whole based on matching features in different images and/or by using information from other of the listed hardware components, but without using any data from any such depth sensors. In addition, while directional indicator 109 is provided for reference of the reader, the mobile device and/or ICA system may not use such absolute directional information in at least some embodiments, such as to instead determine relative directions and distances between panorama images 210 without regard to actual geographical positions or directions.

In operation, a user associated with the mobile device arrives at a first viewing location 210A within a first room of the building interior (in this example, an entryway from an external door 190 to the living room), and captures a view of a portion of the building interior that is visible from that viewing location 210A (e.g., some or all of the first room, and optionally small portions of one or more other adjacent or nearby rooms, such as through doors, halls, stairs or other connecting passages from the first room) as the mobile device is rotated around a vertical axis at the first viewing location (e.g., with the user turning his or her body in a circle while holding the mobile device stationary relative to the user's body). The view capture may be performed by recording a video and/or taking a succession of images, and may include a number of objects or other features (e.g., structural details) that may be visible in images (e.g., video frames) captured from the viewing location—in the example of FIG. 1B, such objects or other features may generally include the doorways 190 and 197 (e.g., with swinging and/or sliding doors), windows 196, corners or edges 195 (including corner 195-1 in the northwest corner of the building 198, corner 195-2 in the northeast corner of the first room, and other corners or edges that are not shown, including between walls and floors or ceilings), furniture 191-193 (e.g., a couch 191; chairs 192, such as 192-1 and 192-2; tables 193, such as 193-1 and 193-2; etc.), pictures or paintings or televisions or other objects 194 (such as 194-1 and 194-2) hung on walls, light fixtures (such as light fixture 130 of FIGS. 2A-2I), etc. The user may also optionally provide a textual or auditory identifier to be associated with a viewing location, such as "entry" for viewing location 210A or "living room" for viewing location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first viewing location 210A has been adequately captured (e.g., by a full rotation of the mobile device), the user may proceed to a next viewing location (such as viewing location 210B), optionally recording video and/or other data from the hardware components (e.g., from one or more IMUs, from the camera, etc.) during movement between the viewing locations along a travel path 115. At the next viewing location, the user may similarly use the mobile device to capture one or more images from that viewing location. This process may repeat from some or all rooms of the building (preferably all rooms) and optionally external to the building, as illustrated for viewing locations 210C-210J. The acquired video and/or other images for each viewing location are further analyzed to generate a panorama image for each of viewing locations 210A-210J, including in some embodiments to match objects and other features in different images. Subsequent further processing and analysis may be performed in order to 'link' at least some of the panoramas together with lines 215 between them, as discussed further with respect to FIGS. 1C-1D, such as to determine relative positional information between pairs of viewing locations that are visible to each other and, to store corresponding inter-panorama links (e.g., links in directions 215-AB, 215-BC and 215-AC between viewing locations A and B, B and C, and A and C, respectively), and in some embodiments and situations to further link at least some viewing locations that are not visible to each other (e.g., between viewing locations 210B and 210E).

FIGS. 1C and 1D provide further details regarding one example of performing linking operations using panorama images such as from viewing locations 210 of FIG. 1B, including to determine relative positional information between the viewing locations for use in inter-connecting panorama images or other visual information corresponding to those viewing locations. While the example of FIGS. 1C and 1D uses information about a travel path that the user takes between viewing locations to perform linking operations between panorama images for those viewing locations, linking operations between panorama images may be performed in part or in whole using other techniques in other embodiments, such as by identifying the same features in different panorama images that have overlapping fields of view (e.g., for different panorama images in the same room) and by using the relative locations of those features in the different images to determine relative position information between the viewing locations of the panorama images.

In particular, FIG. 1C provides additional information 103, including about portions of the path 115ab and 115bc that reflect the user moving from viewing location 210A to viewing location 210B, and subsequently from viewing location 210B to 210C, respectively. It will be appreciated that the order of obtaining such linking information may vary, such as if the user instead started at viewing location 210B and captured linking information as he or she traveled along path 115bc to viewing location 210C, and later proceeded from viewing location 210A to viewing location 210B along travel path 115ab with corresponding linking information captured (optionally after moving from viewing location 210C to 210A without capturing linking information). In this example, FIG. 1C illustrates that the user departs from the viewing location 210A at a point 137 in a direction that is just west of due north (as previously indicated with respect to directional indicator 109 of FIG. 1B), proceeding in a primarily northward manner for approximately a first half of the travel path 115ab, and then beginning to curve in a more easterly direction until arriving at an incoming point 138 to viewing location 210B in a direction that is mostly eastward and a little northward. In order to determine the departure direction from point 137 more specifically, including relative to the direction 120A at which the video acquisition previously began for viewing location 210A (and at which the resulting panorama image begins), initial video information captured as the user travels along travel path 115ab may be compared to the frames of the panorama image for viewing location 210A in order to identify matching frames/images. In particular, by matching one or more best frames in that panorama image that correspond to the information in the initial one or more video frames/images taken as the user departs from point 137, the departure direction from point 137 may be matched to the viewing direction for acquiring those matching panorama images—while not illustrated, the resulting determination may correspond to a particular degree of rotation from the starting direction 120A to the one or more matching frames/images of the panorama image for that departure direction. In a similar manner, in order to determine the arrival direction at point 138 more specifically, including relative to the direction 120B at which the video acquisition began for viewing location 210B (and at which the resulting panorama image begins), final video information captured as the user travels along travel path 115ab may be compared to the frames of the panorama image for viewing location 210B in order to identify matching frames/images, and in particular to frames/images in direction 139 (opposite to the side of viewing location 210B at which the user arrives).

While such departure direction and arrival direction would allow the actual relative direction 215-AB between the viewing locations 210A and 210B to be determined if the travel path 115ab was substantially straight, that is not the case in this example—instead, in order to determine the direction 215-AB, acceleration data captured as part of the linking information for the travel path 115ab is analyzed to identify user velocity and location along the travel path 115ab, in order to model the resulting relative locations of the travel path between starting point 137 and arrival point 138. In this example, the acceleration data acquired for the north-south direction (e.g., from one or more IMU units in a mobile device carried by the user) indicates that there is an initial significant acceleration spike in the northerly direction as the user began moving, which then drops to near zero as the user maintains a constant velocity in a generally northern direction along the middle portion of the travel path 115ab, and then begins a longer but less sharp acceleration in the southerly direction as the user curves to a primarily easterly direction toward viewing location 210B and decelerates at arrival. The acceleration data may be integrated to determine corresponding north-south velocity information, and then further integrated to determine location information for each data point. By combining the determined velocity and location information, an amount of north-south movement by the user along travel path 115ab may be determined, corresponding to an aggregate amount of north-south distance traveled between viewing locations 210A and 210B. In a similar manner, acceleration and velocity information may be determined in an east-west direction for the travel path 115ab as the user moves along the travel path, with the resulting double integration in velocity and location data providing an aggregate amount of east-west distance that the user travels along the travel path 115ab. By combining the aggregate north-south and east-west distances (and assuming in this example that no height change occurred, although height information may be obtained and analyzed in a similar manner in some embodiments) with the determined departure and arrival information, a total distance traveled between viewing locations 210A and 210B in a corresponding direction 215-AB is determined (with direction 215-AB being a two-way direction in this example, from viewing location 210A to 210B and from viewing location 210B to 210A).

Based on a similar analysis of departing direction from viewing location 210B, arrival direction at viewing location 210C, and intervening velocity and location for some or all data points for which acceleration data is captured along the travel path 115bc, the user's movement for travel path 115bc may be modeled, and resulting direction 215-BC and corresponding distance between viewing locations 210B and 210C may be determined. As a result, inter-panorama link 225B-C may be determined in a direction 215-BC to viewing location 210C, with corresponding information included in the panorama image generated at viewing location 210B, and inter-panorama link 225C-B may similarly be determined in direction 215-BC to viewing location 210B, with corresponding information included in the panorama generated at viewing location 210C. Similarly, inter-panorama link 225A-B from viewing location 210A to 210B may be determined in a direction 215-AB to viewing location 210B from 210A, with corresponding information included in the panorama image generated at viewing location 210A, and inter-panorama link 225B-A may similarly be determined in direction 215-AV from viewing location 210B to viewing location 210A, with corresponding information included in the panorama generated at viewing location 210B.

Despite the lack of linking information captured between viewing locations 210A and 210C (e.g., because the user did not travel along a path between those viewing locations, because linking information was not captured as a user did travel along such a path, etc.), information 103 further illustrates an example of direction 226 that may optionally be determined between viewing locations 210A and 210C based at least in part on the analysis of linking information for travel paths 115ab and 115bc (and with corresponding inter-panorama links 225A-C and 225C-A being generated in direction 226 and included in the panorama images for viewing locations 210A and 210C, respectively). In particular, even if an absolute location of viewing locations 210A, 210B and 210C are not known from the analysis of the linking information for travel paths 115ab and 115bc, relative locations of those viewing locations may be determined in a manner discussed above, including estimated distances and directions between viewing locations 210A and 210B and between viewing locations 210B and 210C. In this manner, the third side of the resulting triangle having determined lines 215-AB and 215-BC may be determined to be line 226 using geometrical analysis, despite the lack of direct linking information between viewing locations 210A and 210C. It will be further noted that the analysis performed with respect to travel paths 115ab and 115bc, as well as the estimation of direction and distance corresponding to 226, may be performed in this example regardless of whether or not viewing locations 210A, 210B and/or 210C are visible to each other—in particular, even if the three viewing locations are in different rooms and/or are obscured from each other by walls (or by other structures or impediments), the analysis of the linking information may be used to determine the relative locations discussed above (including directions and distances) for the various viewing locations. It will be appreciated that the techniques illustrated with respect to FIGS. 1C and 1D may be continued for all viewing locations in building 198, resulting in a set of linked panorama images corresponding to viewing locations 210A-J, or otherwise in other similar buildings or other structures.

FIG. 1D depicts a block diagram of the building interior environment in which the panorama images have been generated and linked. In particular, FIG. 1D is similar to FIG. 1B, but lacks details about the path 115 and user mobile device 185 (as well as exterior viewing locations 210I-J), while adding information about inter-panorama links in two-way directions 215, which include illustrated links between viewing locations 215A and 215B in direction 215-AB, between viewing locations 215B and 215C in direction 215-BC, and between viewing locations 215A and 215C in direction 215-AC. FIG. 1D further illustrates that inter-panorama links may be determined and used in some embodiments and situations to further link at least some viewing locations that are not visible to each other (e.g., the link in direction 215-BE between viewing locations 210B and 210E).

Various details are provided with respect to FIGS. 1A-1D, but it will be appreciated that the provided details are non-exclusive examples included for illustrative purposes, and other embodiments may be performed in other manners without some or all such details.

FIGS. 2A-2I illustrate examples of automatically analyzing and using sensor data on a handheld mobile device that is acquiring images from a building interior in order to control the image acquisition, such as based on the building 198 and inter-connected panorama images for viewing locations 210 discussed in FIGS. 1B-1D. In these examples, various details are discussed with respect to the panorama image acquired at viewing location 210B in the living room 229a of the illustrated building—it will be appreciated that similar analysis may be performed for that same room by using the panorama image information for viewing locations 210A and 210C, and for the other rooms of the building. In this example, the southeast room of the building does not have any viewing locations within or closely adjacent to the room, and thus an analysis may not be performed for it with respect to such in-room viewing location position, although information from other viewing locations with visibility into that room (e.g., viewing locations 210G and 210H) may be used at least in part for other types of information acquired from analysis of panorama images. In addition, for purposes of this example, small areas such as closets and alcoves/nooks are not analyzed as separate rooms, but are instead treated as part of the larger containing room (optionally as unmapped space within the room), although in other embodiments such small areas could instead be separately represented (including to optionally have one or more viewing locations located within them). Similarly, while the east-west hallway is modeled as a separate room in this example, in other embodiments such hallways may instead be treated as part of one or more rooms connecting to the hallway, or instead the hallway may be treated as a connecting passage between rooms rather than as a separate room.

Figure 2A:
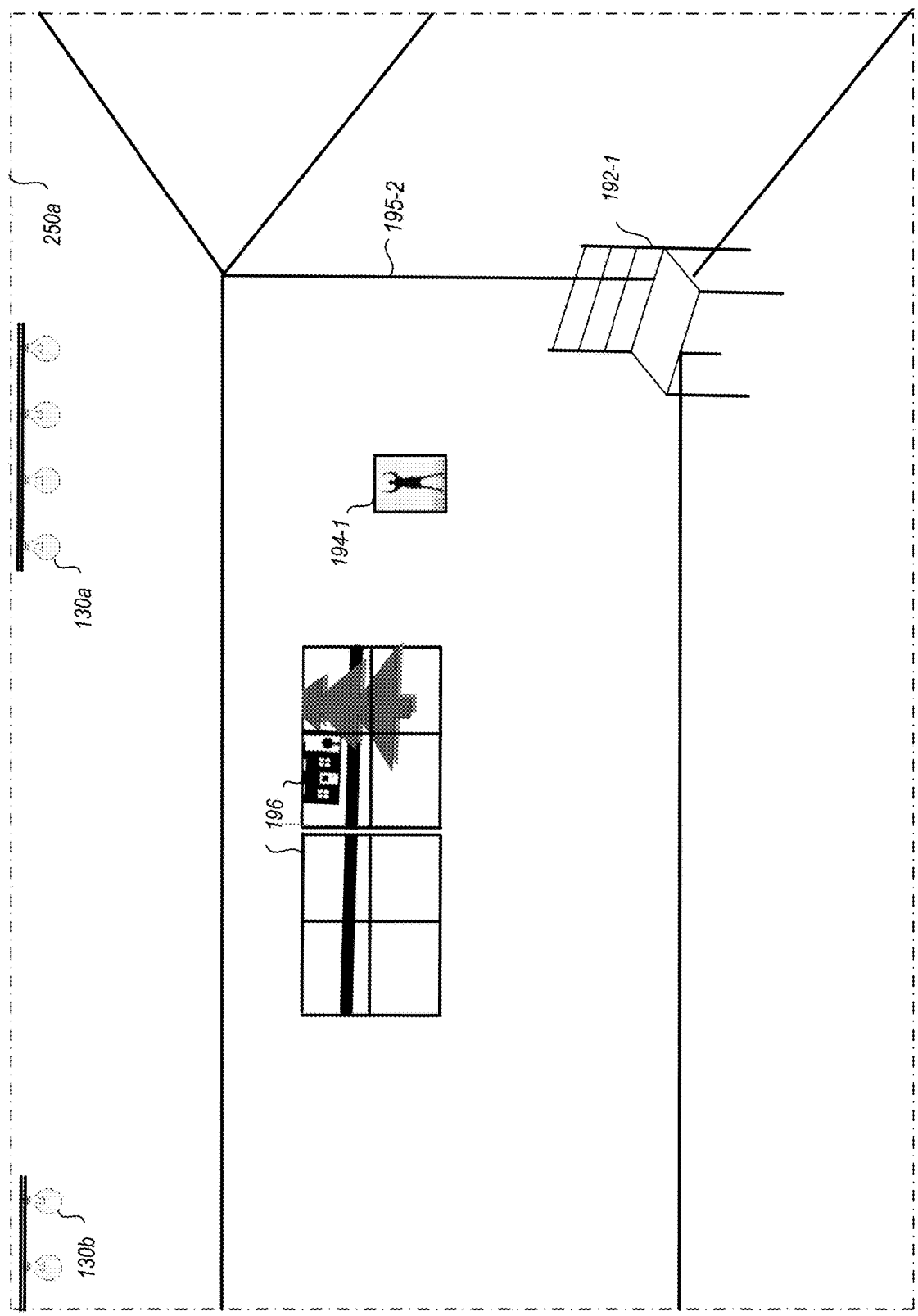
FIGS. 2A-2I illustrate examples of automatically analyzing and using sensor data on a mobile device that is acquiring images from a building interior in order to control the image acquisition.

In particular, FIG. 2A illustrates an image 250a that may be visible on a display of a user mobile device (or other device) that is captured when a user is standing at viewing location 210B of room 229a of building 198 in starting direction 120B, as discussed in greater detail with respect to FIGS. 1B-1D. In this example, the user has not yet begun to acquire a panorama image from the viewing location 210B, but is about to initiate that process. FIG. 2A illustrates various objects in the room 229a that are visible in the image 250a, including chair 192-1, border 195-2, picture or painting 194-1, windows 196, and light fixtures 130a and 130b.

Figure 2B:
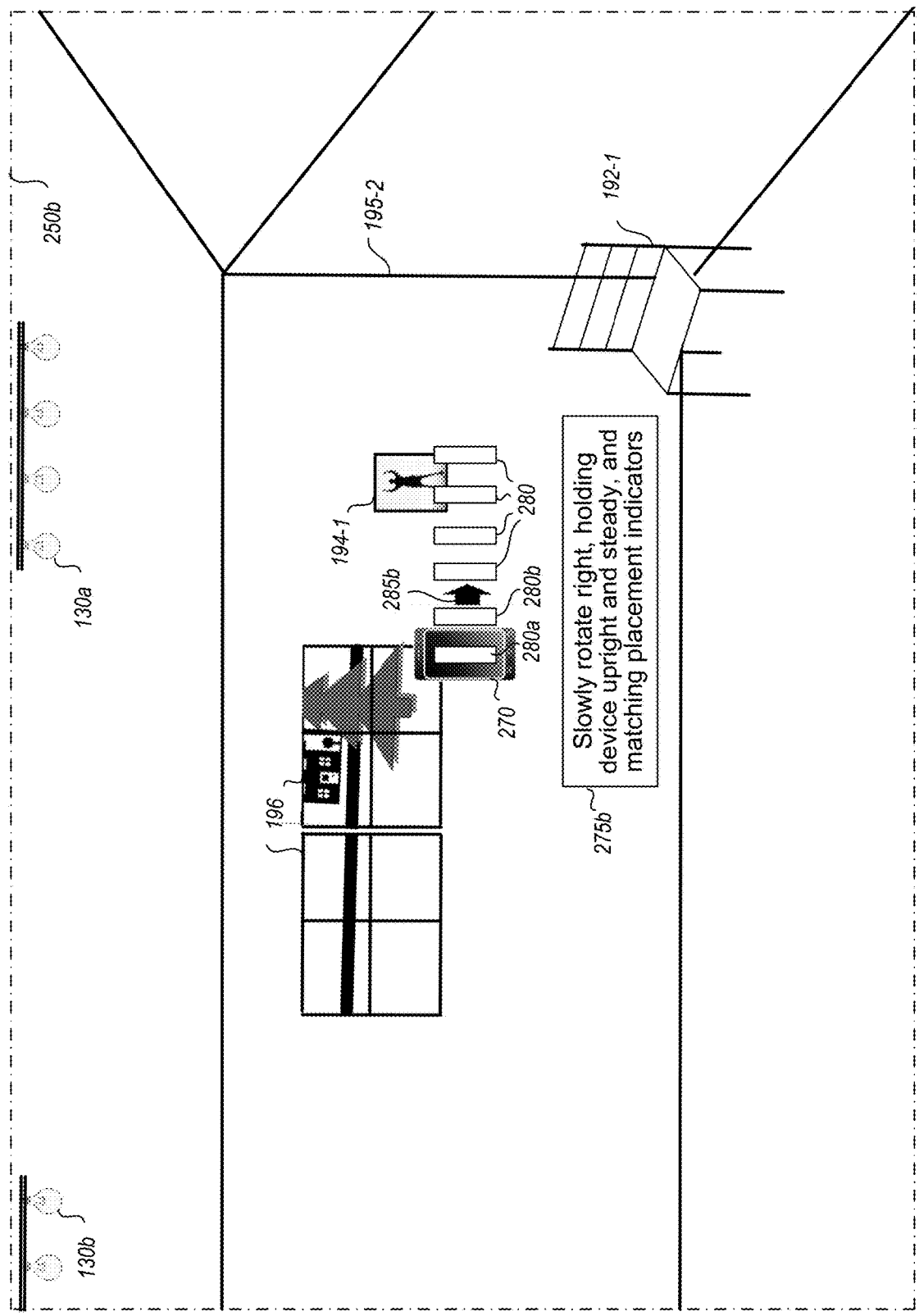

FIG. 2B continues the example of FIG. 2A, and illustrates information from a displayed GUI overlaid on the image 250a of FIG. 2A. In particular, and is discussed in greater detail elsewhere herein, the ICA system may use information from the hardware sensors of the handheld user mobile device to determine a current position in 3D space (geometric orientation and optionally location) of the mobile device as it is held by the user, and use that information as part of the displayed GUI. In this example, the displayed GUI includes a displayed current position indicator 270 that represents the current position of the mobile device, which in this example is centered in the middle of the image 250b. In addition, the display GUI includes a number of displayed target position indicators 280 in this example to indicate target positions from viewing location 210B at which to acquire images for use in generation of a panorama image representing viewing location 210B, although such visual indicators may not be included in other embodiments (e.g., in embodiments in which continuous video is captured rather than a series of separate images)—in this example, the displayed target position indicators include a current target position indicator 280a, a next target position indicator 280b, and additional future target position indicators as are illustrated. The displayed GUI in this example further includes a directional indicator 285b to provide a visual indication of a direction in which the user is to rotate or turn at viewing location 210B, as well as a textural overlay 275b in this example to provide instructions regarding beginning the capture of the panorama image from the viewing location.

The target positions at which to acquire and save images from a viewing location may be determined in various manners in various embodiments. For example, in some embodiments a defined quantity N of images is selected and evenly spaced in a 360° circle around a viewing location (e.g., to correspond to every M degrees, where M is 360 divided by N) at a constant angle of tilt, swivel and pivot relative to the user's turning body (e.g., by maintaining the handheld mobile device in a level, non-changing position relative to the user's body while the body turns). In other embodiments, the target positions may be determined relative to one or previous positions at which images are acquired and saved, such as based on an amount of rotation and/or time since a last saved image, an amount of overlap in content with one or more previous saved images, etc. In addition, in some embodiments the target positions are determined to be continuous or substantially continuous, such as when video is being acquired at a rotation rate that matches or is below a defined threshold, and some or all acquired video frames correspond to target positions. Furthermore, while the target positions are in some embodiments acquired at a single angle of tilt, swivel and pivot relative to the user's turning body (e.g., straight outward and perpendicular to a line bisecting the user's body from head to feet), in other embodiments the target positions may be selected to vary in one or more such rotational measures, and potentially to be acquired in multiple user rotations at a viewing location—as one example, in order to generate a panorama that allows an end user to tilt up to see the ceiling and/or down the see the floor (e.g., for a panorama image that includes data for a complete or largely complete sphere from a viewing location), target positions may include some with a tilt angle that corresponds to straight outward from the user's turning body (i.e., perpendicular to a line bisecting the user's body from head to feet), some with a tilt angle downward (e.g., 45° down relative to outward), and some with a tilt angle upward (e.g., 45° up relative to outward). In other embodiments, the target positions may be determined in part or in whole based on user preferences or other user configuration performed (e.g., before the image acquisition begins at a viewing location). It will be appreciated that target positions may be selected in other manners in other embodiments.

In addition, while the example of FIG. 2B (and the continuing examples of FIGS. 2C-2I) illustrate capturing images in the visual light spectrum, it will be appreciated that other embodiments may capture other types of information, whether instead of or in addition to such visual light images. Examples of such other types of information that may be acquired and saved, and optionally included in the panorama image to be generated or otherwise associated with it, including light in one or more other ranges (e.g., infrared, ultraviolet, etc.), other types of electrical signals and/or magnetic fields (e.g., radiation, cell phone signals, Wi-Fi signals, etc.), audio information from the surrounding environments, verbal and/or textual annotations (e.g., descriptions of the viewing location and/or objects in the surrounding environment), etc. Furthermore, when target position indicators are visually included in a displayed GUI (whether for target positions whose images and/or other information has already been acquired and saved, and/or for target positions whose images and/or other information are to be saved in the future), they may further be altered in some embodiments (e.g., with respect to shape, size, visual appearance, type of element, etc.) to indicate one or more types of metadata associated with those target positions, such as the type of information acquired, recency of acquisition, quality of acquired information, etc.

Figure 2C:
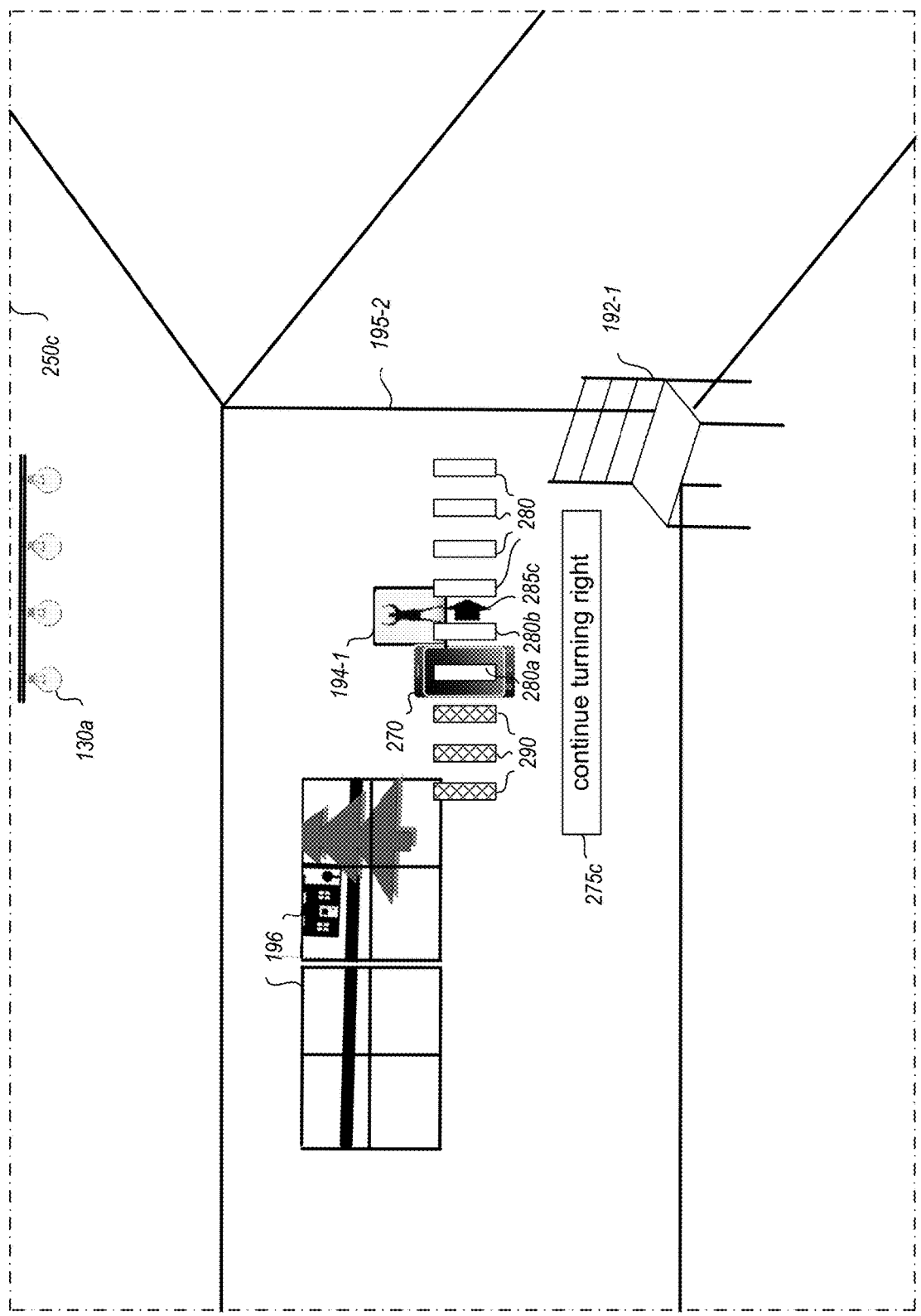

FIG. 2C continues the examples of FIGS. 2A-2B, and illustrates an image 250c that represents a short time after that of FIG. 2B, and in which the panorama image capture process has begun. In particular, in this example the visual current position indicator 270 of the mobile device continues to be centered in the image 250c, but as the user has begun to turn at viewing location 210B, additional portions of the room to the right have become visible, while portions of the room to the left (e.g., light fixture 130b) are no longer visible. In addition, as the user turns, the ICA system continues to monitor data from the hardware sensors of the mobile device in a real time manner, including to determine current position (geometric orientation and optionally location) of the mobile device as the user turns. In this example, additional visual past target position indicators 290 have been added to the left of the current position indicator 270, which represent indications of past target positions at which images should have already been captured, and which in this example have been successfully completed.

Accordingly, the current target position indicator 280a and next target position indicator 280b have been moved relative to the room interior to represent the changing next position at which to acquire additional images, and the turn direction indicator 285c has similarly been moved. In this example, the textual indicator 275c has also been updated, although in other embodiments the textual indicator may not change or may no longer be displayed in this situation. In this example, the past target position indicators 290 of acquired images further may use visual indications that indicate a success and/or quality of the images acquired and saved from those positions, such as to use a particular color to indicate a full success, and optionally one or more other colors to indicate a lack of success or degrees of success at the capture. In this example, the successful visual acquisition indication is a cross hatch pattern shown in the past target position indicators 290, although it will be appreciated that other visual indications may be used in other embodiments, and that in some embodiments such visual indications of success or lack of success may not be shown, and further than in other embodiments no such past target position indicators 290 (also referred to herein as a "trail") may be illustrated.

Figure 2D:
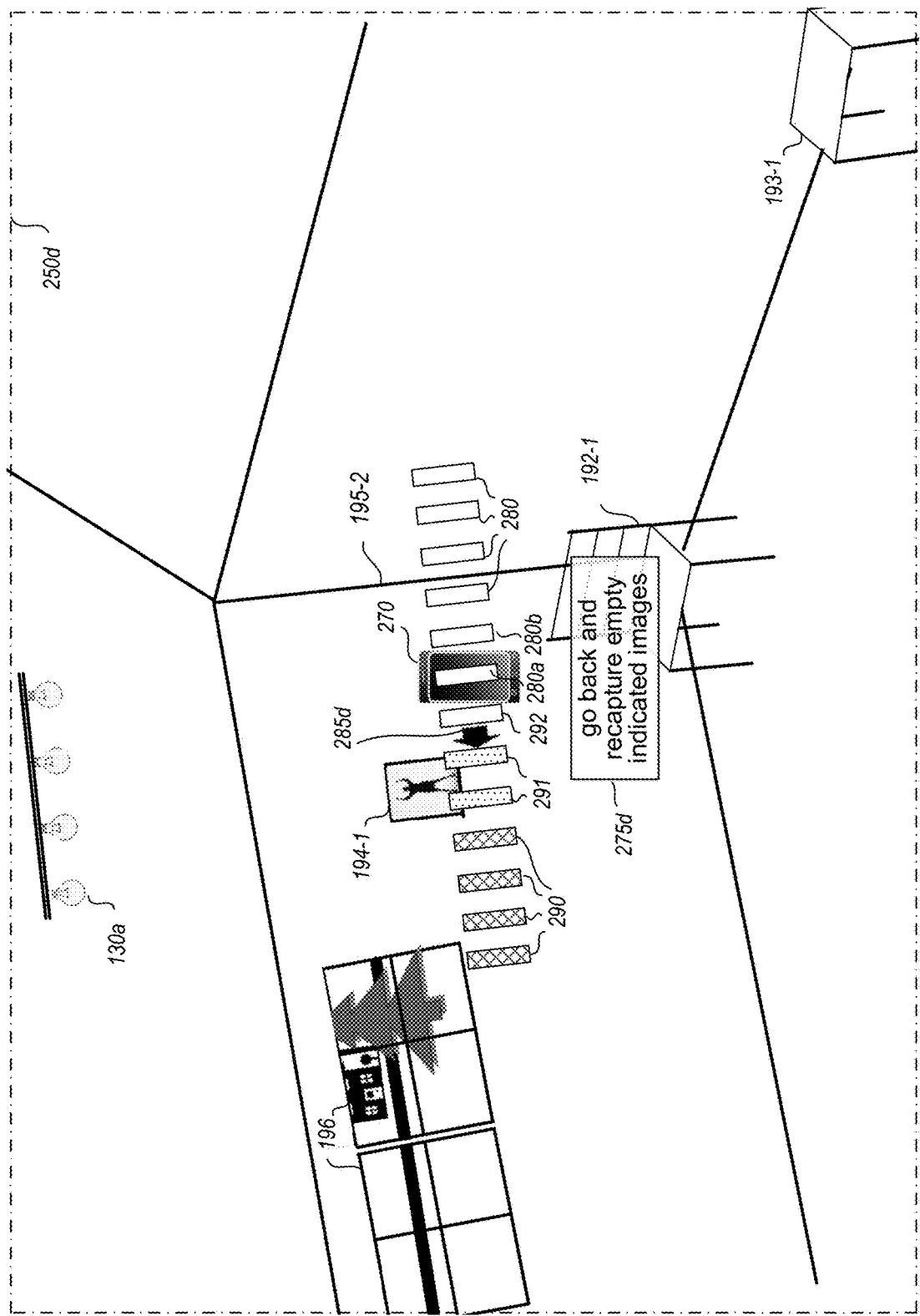

FIG. 2D continues the examples of FIGS. 2A-2C, and corresponds to a period of time shortly after that illustrated in FIG. 2C. While the example of FIG. 2C previously indicated a continuing successful capture of images as the user rotated, based on the user maintaining a correct position of the mobile device as he or she turned, FIG. 2D illustrates an alternative situation in which the orientation of the mobile device is no longer correct, and corresponds to the mobile device being pivoted side-to-side (with the right side of the mobile device higher than the left side) such that it is not level with the room, and such that its current position indicator 270 no longer matches the indicators 280 for the target positions to acquire. In this example, the current position indicator 270 of the mobile device continues to be displayed in the center of the new image 250d and in the same level orientation relative to the borders of the image, but the actual room and its contents are shown in a skewed manner to correspond to the image captured by the mobile device due to its rotation. Accordingly, the displayed GUI has been updated in multiple manners in this example to indicate the lack of successful capture of one or more images for current and/or past target positions due to the incorrect rotation of the user device—in particular, the ICA system acquires and uses data from hardware sensors of the handheld mobile device as the user turns to determine whether or not to capture images for the target positions, such as to not capture the image for the past target position 292 in this example due to the skewing of the handheld mobile device and/or other problems with the positioning and movement of the mobile device for that past target position, and to capture images at other past target positions 291 in this example but to associate them with lower quality (e.g., to potentially replace them with higher quality images if they become available, and/or to not use those images or to otherwise give them lower weight or other influence when later using the captured images to generate additional mapping-related information).

Accordingly, the textual indicator 275*d* has been updated to indicate to the user to go backwards and recapture one or more images that were not successfully captured at one or more past target positions, which in this example corresponds to at least the past target position 292, as is shown with empty contents and no pattern to indicate a lack of successful image acquisition and saving, and in other embodiments could be illustrated with a particular color or in other visual manners. The turn indicator 285*d* that is illustrated similarly indicates to the user to return in the opposite direction of the previous user turn to arrive back at the target position 292 that needs to be recaptured. In this example, two additional past target positions have indicators 291 that are shown with a different fill pattern (and in other embodiments could have a different color or other visual indication) to indicate partial success, such as to indicate that the images are not ideal but meet a minimum threshold of quality for use in the subsequent generation of the panorama image, although in other embodiments such non-ideal captured images may similarly be recaptured. Alternatively, such non-ideal or failed image acquisitions for past target positions may not be recaptured in this manner, or at all, in other embodiments—as one example, a user may instead be requested to do multiple rotations of the room from the viewing location 210B, such that a second rotation may provide sufficient images at one or more such target positions 292 and/or 291, while in other embodiments the generation of the panorama image may be possible from other nearby successful image orientations 290. In addition, the further rotation of the user illustrated in FIG. 2E has now brought part of table 193-1 into view.

Figure 2E:
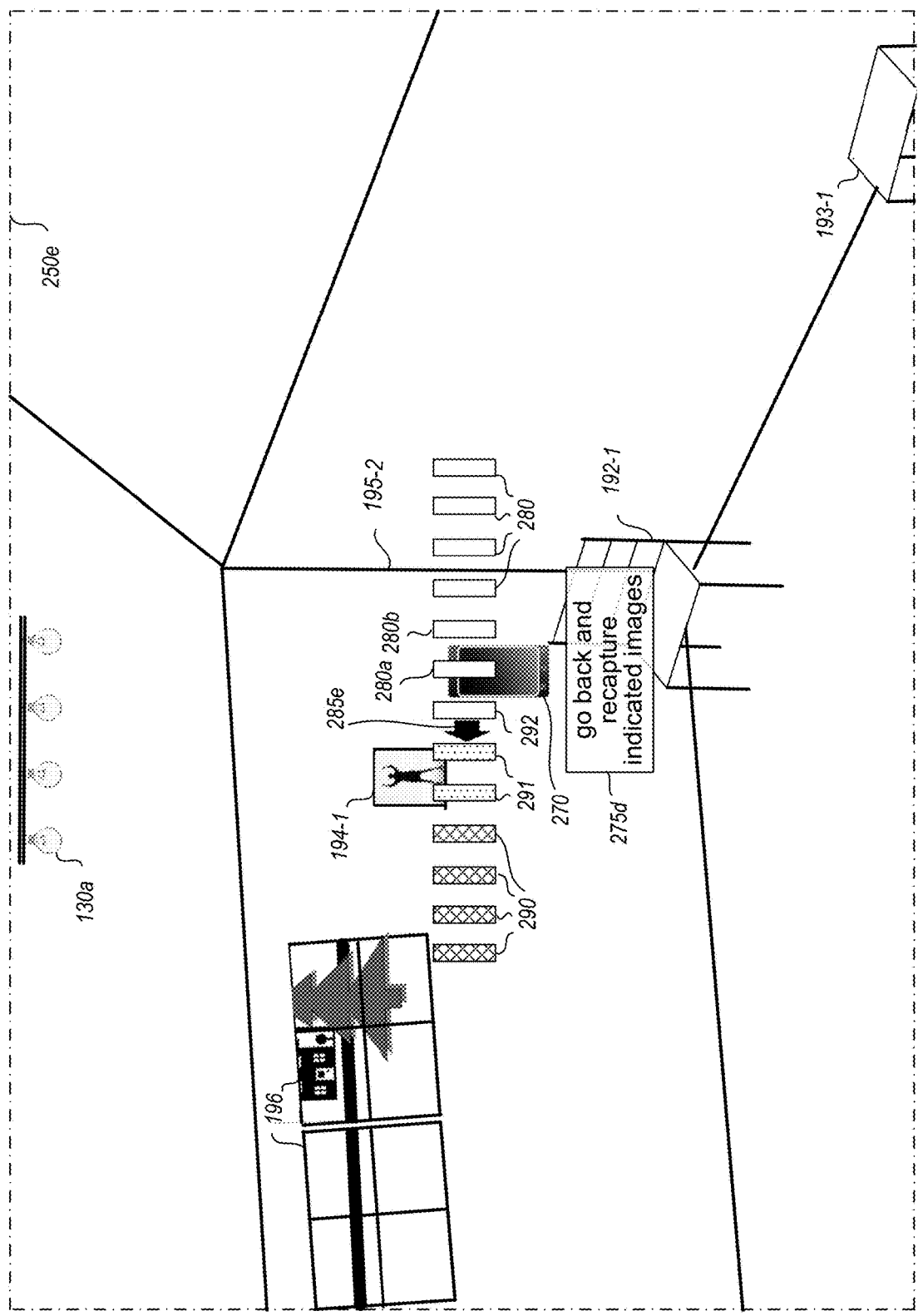

FIG. 2E continues the examples of FIGS. 2A-2D, and in this case illustrates an image 250*e* that is an alternative type of problem that may occur at the same location as that previously discussed with respect to FIG. 2D. In particular, the orientation of the mobile device is not pivoted in this example, but is tilted downward (with the top of the mobile device farther from the user's body than the bottom of the mobile device) at a level such that its current position indicator 270 no longer matches the indicators 280 for the target positions to acquire, similarly resulting in a past target position 292 that was not successfully captured, and other past target positions 291 corresponding to partial success in their respective images. It will be appreciated that other types of problems with orientation and/or location of the mobile device may similarly occur, as well as other problems corresponding to particular images (e.g., insufficient light, user rotation that is too fast so as to cause blurring, a finger or other object blocking a portion of the image being captured, etc.).

Figure 2F:
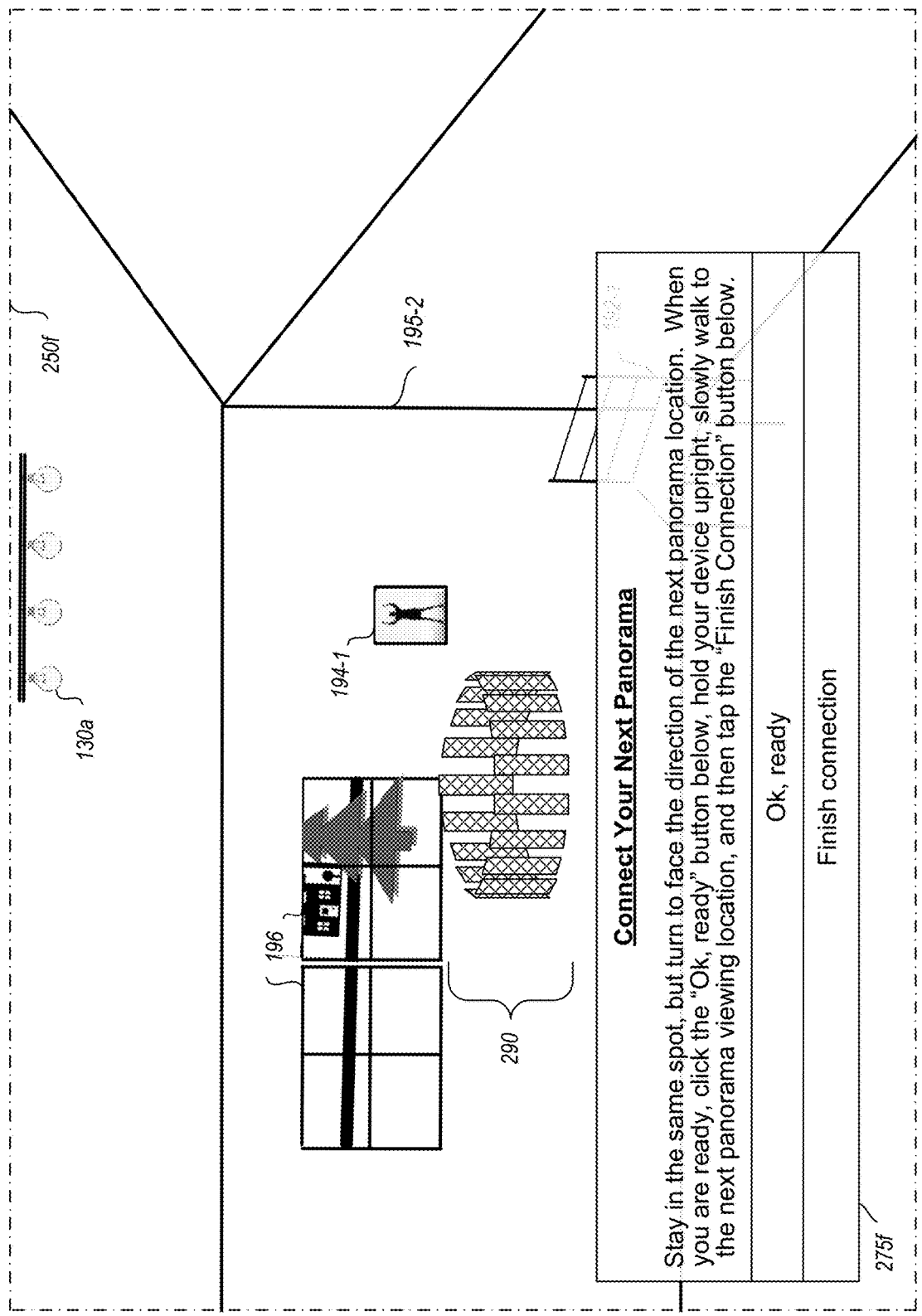

FIG. 2F continues the examples of FIGS. 2A-2E, and corresponds to a period of time at which the user has completed a full rotation at viewing location 210B and successfully captured images at each of the determined target positions, as illustrated by the completed visual past target position indicators 290 that are overlaid on image 250*f* of FIG. 2F. Since the user has completed a full rotation, the view of the room in the direction of the image 250*f* corresponds to that of the beginning image 250*a* when the panorama image capture began. In this example, the illustrated GUI has been updated to include additional textual information 275*f* with instructions to the user to continue the process, and in particular to connect the panorama image for the viewing location 210B that was just captured to a next viewing location and corresponding panorama to be captured, such as at viewing location 210C in this example. It will be appreciated that other types of directions may be used in other embodiments to assist a user in moving to a next viewing location and/or capturing acquisition metadata along a travel path to that next viewing location.

Figure 2G:
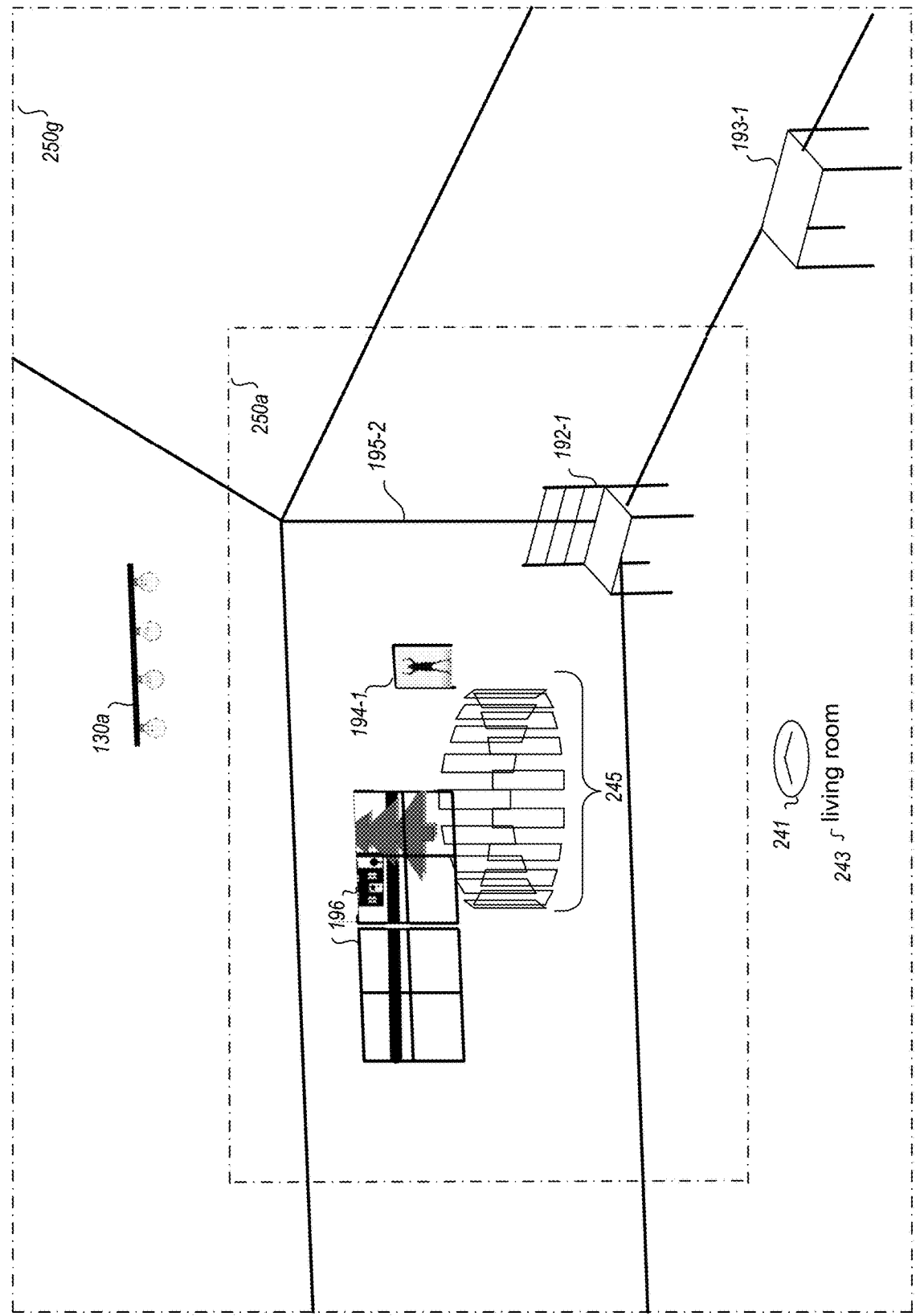

FIG. 2G illustrates an alternative image 250*g* that corresponds to a view of a completed panorama image from viewing location 210A in a direction 215-AB toward viewing location 210B, such as after the generation of inter-connected panorama images for building 198 is complete. In this example, a dashed line 250*a* is indicated to show the image visible from viewing location 210B within the larger current image 250*g* (with a wider angle of view, since taken at a greater distance from the objects shown in FIG. 2A), although such a visual indication 250*a* may not be displayed to a user in other embodiments. FIG. 2G further illustrates that after panorama images have been generated and linked, the displayed GUI shown to an end user may further include visual elements that allow movement between viewing locations and their panorama images, such as in this example to include a user-selectable control 241 that the user may select to move to view the panorama image acquired at viewing location 210B. The displayed GUI further includes textual information 243 that provides a textual indicator of the viewing location 210B, which in this example is labeled "living room." In addition, FIG. 2G further illustrates information 245 that may be displayed in some embodiments to a user, whether after the generation of inter-connected panorama images for building 198 is complete, and/or during the process of capturing additional panorama images after a panorama image has been acquired at viewing location 210B and while the user is at a different viewing location from which that viewing location 210B is visible. In particular, in this example the visual indicators 245 may illustrate to the user that the panorama images have been already acquired for the illustrated location corresponding to viewing location 210B, such as to provide a visual indication to the user that a corresponding portion of the building interior has already been captured and does not need to be repeated. Alternatively, such visual indicators 245 may be displayed to an end user in some embodiments to illustrate that other images are available for viewing at the illustrated positions, whether in addition to or instead of indicators 241 and 243, and optionally in a user-selectable manner such that the user may select one of the displayed indicators 245 and switch to a view in the viewing location 210B's generated panorama in that direction. In other embodiments, such visual indicators 245, 241 and/or 243 may not be illustrated to end users (e.g., using client computing devices 175 of FIG. 1A, and after completion of the inter-panorama connection process) and/or users during the process of capturing and generating the panorama images. While not illustrated in FIG. 2G, an end user may further manipulate the displayed panorama image view 250*g* in various ways, such as by the user dragging, scrolling, zooming or otherwise moving the view direction to alter the view visible from viewing location 210A's generated panorama image.

Figure 2H:
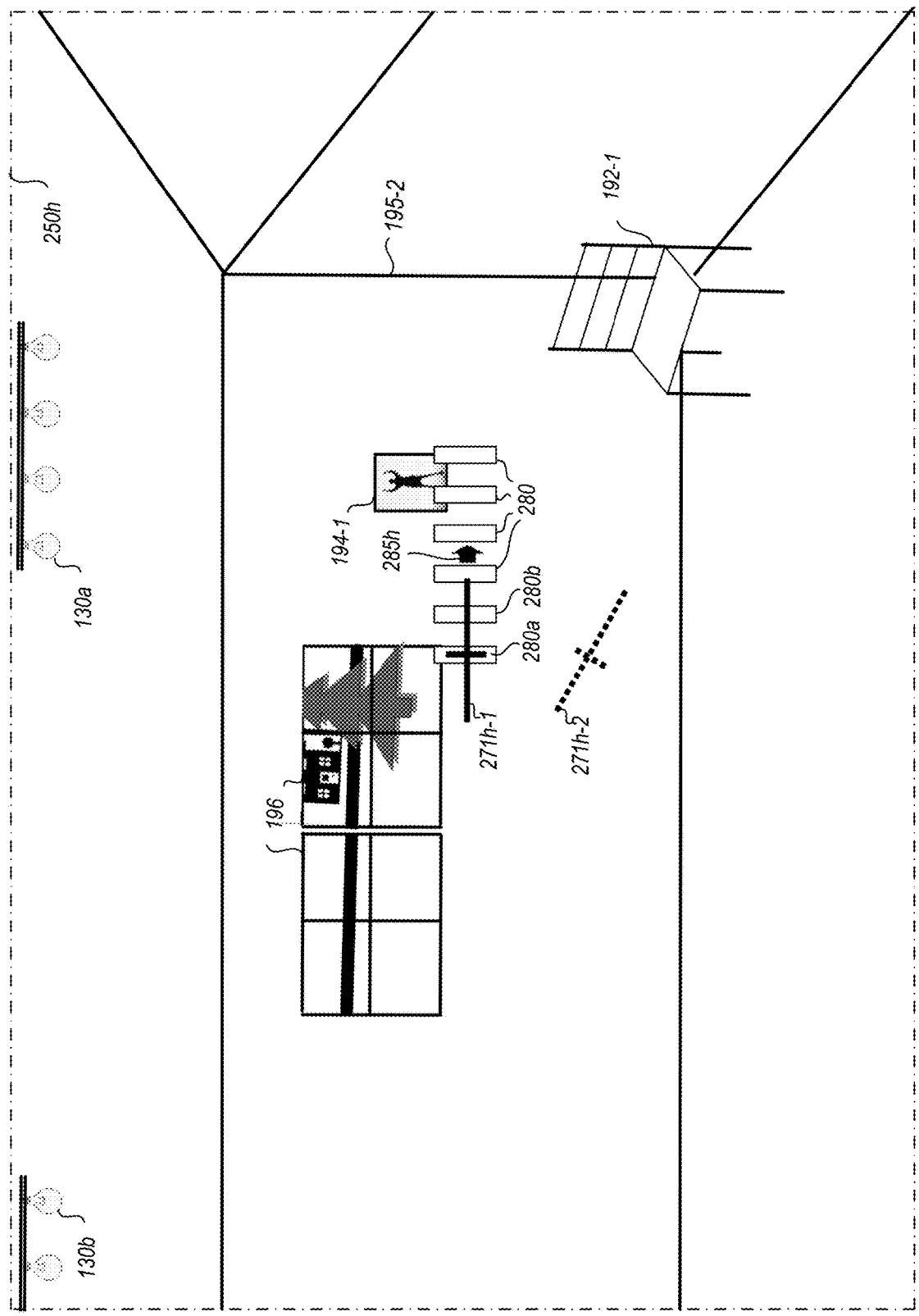
Figure 2I:
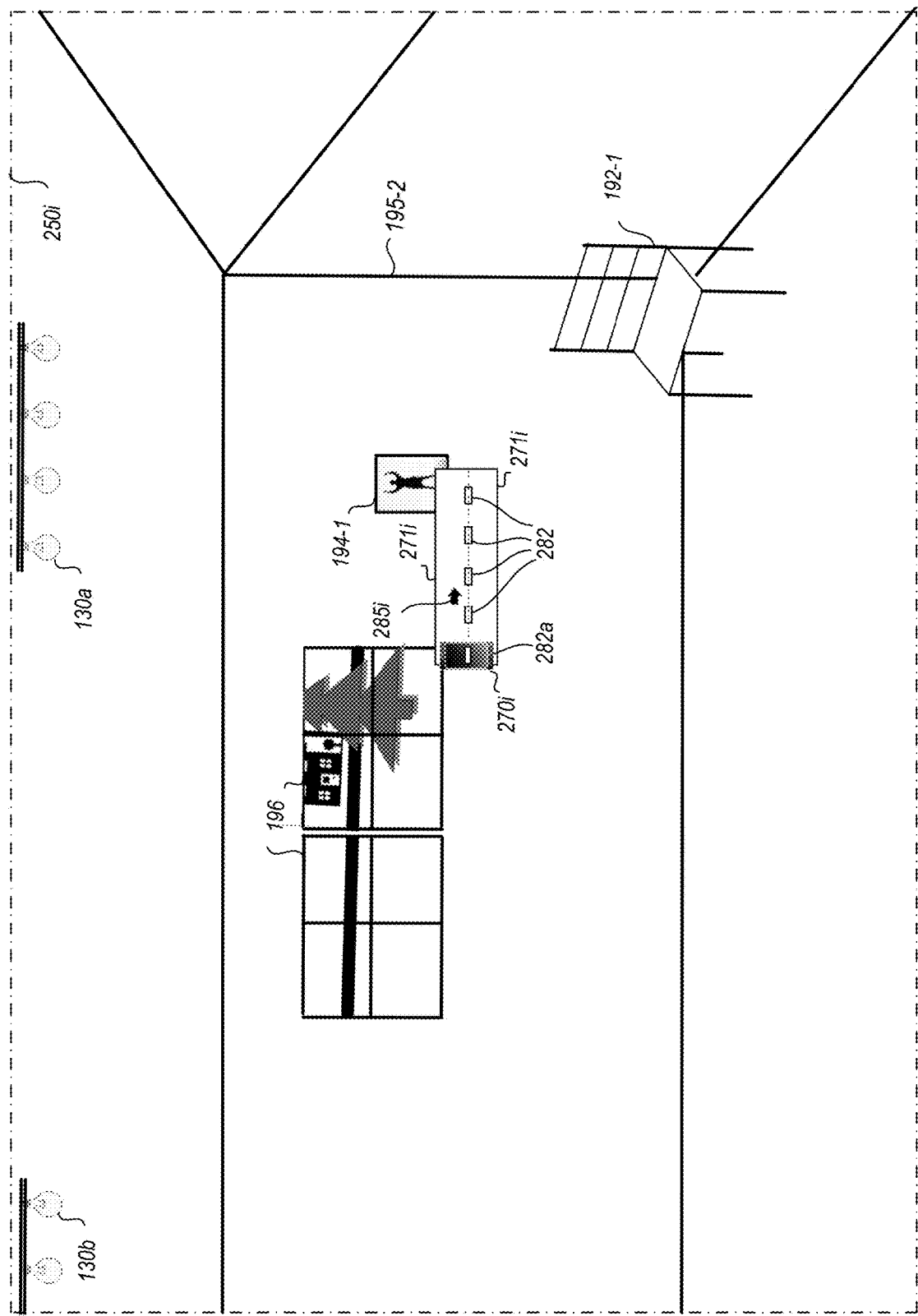

FIGS. 2H and 2I continue the examples of FIGS. 2A-2G, and particular illustrate alternative examples of current position indicators that may used to assist a user during the process of acquiring a panorama image at a viewing location. In particular, image 250*h* of FIG. 2H is similar to image 250*b* of FIG. 2B from viewing location 210B. However, in FIG. 2H, the displayed GUI that is overlaid on the image 250*h* does not include the previous visual indicator 270 of the mobile device, and instead indicates one or more alternative visual current position indicators 271*h* to assist a user in determining the position (e.g., orientation) of the mobile device. In this example, the visual current position indicator 271*h* includes horizontal and vertical bars displayed perpendicular to each other (such as in a manner similar to an attitude indicator used for an airplane to show the horizon and level flight)—in this example, the visual current position indicator 271*h*-1 is similarly shown in the center of the image, such as to correspond to the beginning of the panorama image acquisition process, with other similar visual target position indicators 280 also illustrated.

FIG. 2H further illustrates an example 271*h*-2 of an alternative visual current position indicator, and which corresponds to a situation in which the user is holding the mobile device at an incorrect orientation (which in this example includes the mobile device being tilted down from the appropriate level of the target indicators 280, being rotated to the right, and being pivoted with the top part of the mobile device father away from the user than the bottom part). In this example, while the actual image of the room from the mobile device's imaging sensor would be rotated and skewed to correspond to the mobile device's orientation (in a manner similar to that illustrated with respect to FIG. 2D), the image 250*h* of the room has been displayed as level, while the current position (orientation) indicator 271*h*-2 has been moved within the image to correspond to the incorrect orientation of the mobile device—in other embodiments, the display of the visual indicator 271*h*-2 may instead be at the center of image while the remaining part of the image is displayed based on what is currently visible from the camera or other imaging sensor of the mobile device.

FIG. 2I illustrates an image 250*i* that is similar to that of FIG. 2H, but in which the current position indicator(s) 271*h* are not shown, and instead a modified version of the indicator 270 of FIG. 2B is shown in a smaller version 270*i* that is similarly in the center of image 250*i*. In addition, in this example the displayed GUI further includes extended upper and lower borders 271*i* in the turning direction 285*i*, such that the user is to keep the displayed indicator 270*i* within the upper and lower boundaries as the user rotates at viewing location 210B. In this example, the displayed GUI further includes indicators 282 to indicate target positions at which the images will be acquired (instead of the target position indicators 280 of FIG. 2B), although such visual indicators may not be included in other embodiments, including in embodiments in which continuous video is captured rather than a series of separate images. It will be appreciated that the displayed GUI of FIGS. 2B-2I may be modified in a variety of other manners that are not explicitly illustrated here.

In addition, while not illustrated in FIGS. 2A-2I, the ICA system may provide other types of real-time feedback to the user of the mobile device in some embodiments via one or more visual guidance cues during the capture of images (including via continuous video) at a viewing location. For example, the ICA system may determine (such as based on sensor data provided by sensor modules 148) that the mobile device is rotating too quickly, and if so may provide an auditory, visual, or other appropriate notification to indicate that the user should rotate the mobile device more slowly. As another example, the ICA application may determine that the mobile device is shaking or otherwise failing to provide high quality video (such as based on sensor data or one or more analyses of particular captured video frames), and if so may provide a notification to advise the user of the problem. As still another example, the ICA system may provide a notification to the user if it is determined that a particular viewing location is unsuitable for capturing information about the building interior, such as if the ICA system detects that lighting conditions or other environmental factors for the present viewing location are negatively affecting the recording process. Furthermore, the ICA system may in certain embodiments prompt a user for information regarding one or more of the viewing locations being captured, such as to provide a textual or auditory identifier to be associated with a viewing location (e.g., "Living Room," "Office," "Bedroom 1" or other identifier), or to otherwise capture descriptive information from the user about the room (e.g., a description of built-in features, a history of remodels, information about particular attributes of the interior space being recorded, etc.). In other embodiments, such identifiers and/or other descriptive information may be determined in other manners, including automatically analyzing video and/or other recorded information for a building (e.g., using machine learning) for the determination. In at least one embodiment, such acquired or otherwise determined identifiers and/or other descriptive information may be later incorporated in or otherwise utilized with the captured information for a viewing location, such as to provide a textual or auditory indication of the identifier or other descriptive information during subsequent display or other presentation of the building interior by the ICA system (or by another system that receives corresponding information from the ICA system).

Various details have been provided with respect to FIGS. 2A-2I, but it will be appreciated that the provided details are non-exclusive examples included for illustrative purposes, and other embodiments may be performed in other manners without some or all such details.

Figure 3:
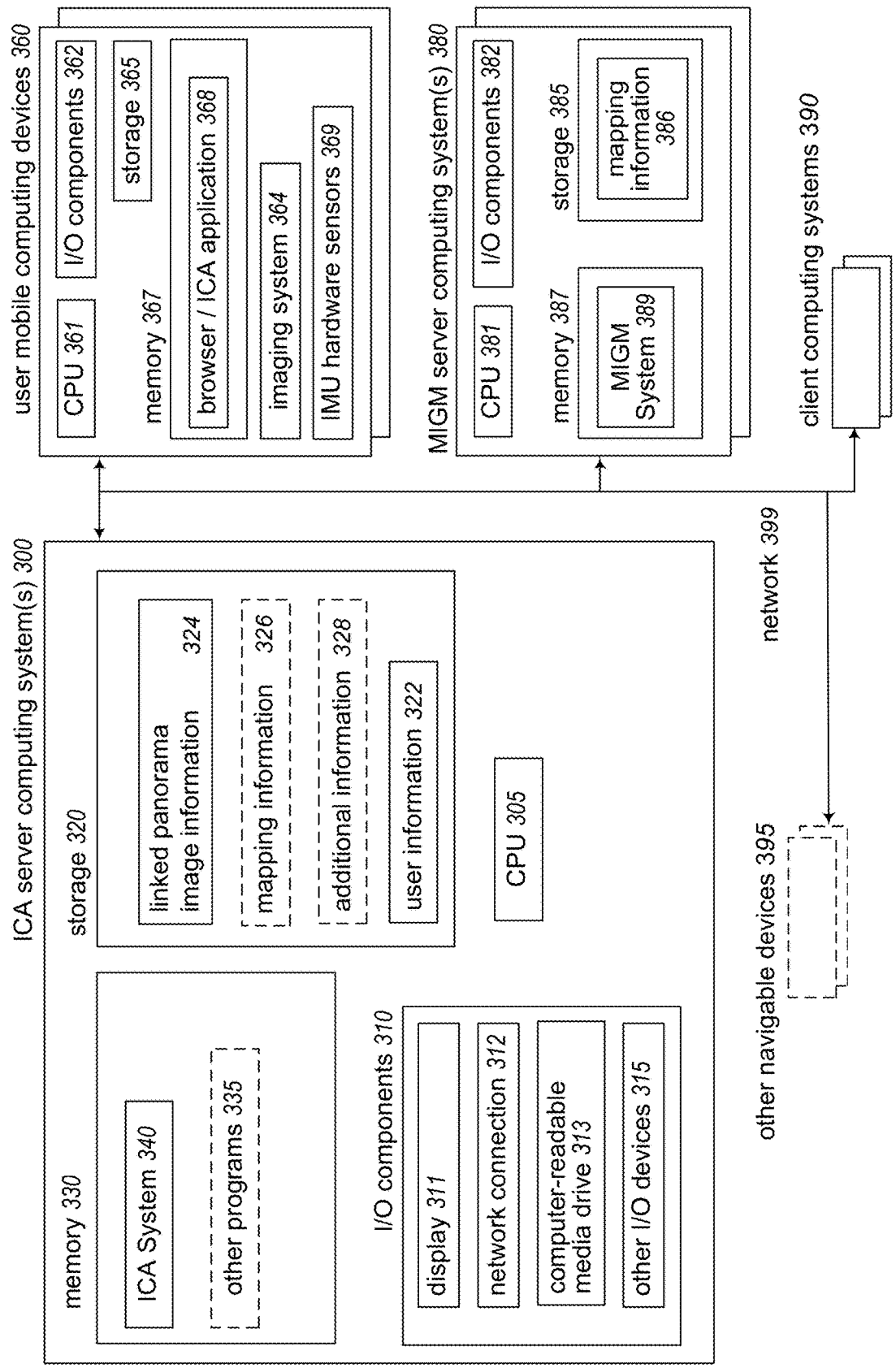
FIG. 3 is a block diagram illustrating a computing system suitable for executing an embodiment of a system that performs at least some of the techniques described in the present disclosure.

FIG. 3 is a block diagram illustrating an embodiment of one or more server computing systems 300 executing an implementation of an ICA system 340—the server computing system(s) and ICA system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing ICA system 340 may communicate with other computing systems and devices via one or more networks 399 (e.g., the Internet, one or more cellular telephone networks, etc.), such as user mobile computing devices 360 (e.g., used to capture building interior data; used to store and provide additional information related to buildings; etc.), MIGM server computing system(s) 380 (e.g., on which an MIGM system executes to generate and provide floor maps and/or other related mapping information 386), user client computing systems 390 (e.g., used to view linked panorama images and/or other related information; etc.), and optionally other navigable devices 395 that receive and use floor maps and optionally other generated information for navigation purposes (e.g., for use by semi-autonomous or fully autonomous vehicles or other devices).

In the illustrated embodiment, an embodiment of the ICA system 340 executes in memory 330 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the ICA system may include one or more components, not shown, to each perform portions of the functionality of the ICA system, and the memory may further optionally execute one or more other programs 335—as one specific example, a copy of the MIGM system may execute as one of the other programs 335 in at least some embodiments, such as instead of or in addition to the MIGM system 389 on the MIGM server computing system(s) 380. The ICA system 340 may further, during its operation, store and/or retrieve various types of data on storage 320 (e.g., in one or more databases or other data structures), such as various types of user information 322, linked panorama image information 324 (e.g., to provide to users of client computing devices 360 for display; for analysis to generate floor maps; etc.), optionally generated floor maps and other associated information 326 (e.g., generated and saved 3D models, building and room dimensions for use with associated floor plans, additional images and/or annotation information, etc.) and/or various types of optional additional information 328 (e.g., defined target position information for image acquisition, defined thresholds to use in assessing image capture information, etc.).

Some or all of the user mobile computing devices 360 (e.g., smartphones), client computing systems 380, client computing systems 390 and other navigable devices 395 may similarly include some or all of the same types of components illustrated for server computing system 300. As one non-limiting example, the server computing systems 380 are each shown to include one or more hardware CPU(s) 381, I/O components 382, storage 385, and memory 387, with an embodiment of the MIGM system 389 executing within memory 387, and with mapping information 386 that is generated by the MIGM system being stored on storage 385. As another non-limiting example, the mobile client computing devices 360 are each shown to include one or more hardware CPU(s) 361, I/O components 362, storage 365, imaging system(s) 364 with one or more imaging sensors (not shown), IMU hardware sensor(s) 369, and memory 367, with one or both of a browser 368 and one or more client applications 368 (e.g., an application specific to the ICA system) executing within memory 367, such as to participate in communication with the ICA system 340, MIGM system 389 and/or other computing systems—in other embodiments, a copy of some or all of the ICA system may instead execute on each of some or all of the user mobile computing devices 360. While particular components are not illustrated for the client computing systems 390 or other navigable devices 395, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ICA system 340 may in some embodiments be distributed in various components, some of the described functionality of the ICA system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ICA system 340 and/or ICA client software 369 executing on server computing systems 300 and/or mobile computing devices 360) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIGS. 4A-4D illustrate an example flow diagram of an embodiment of an ICA System routine 400. The routine may be performed by, for example, the ICA System 160 of FIG. 1A, the ICA System 340 of FIG. 3, and/or the ICA system described with respect to FIGS. 1B-2I and as otherwise described herein, such as to acquire panorama or other images at viewing locations within buildings or other structures in order to generate and link panorama images for multiple such viewing locations, while using sensor data from the acquiring mobile device to control at least some of the image acquisition process. While portions of the example routine 400 are discussed with respect to acquiring images at particular target positions from a viewing location, it will be appreciated that this or a similar routine may be used to acquire video or otherwise acquire a series of images in a continuous or substantially continuous manner. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device.

The illustrated embodiment of the routine begins at block 405, where instructions or information are received. At block 410, the routine determines whether the received instructions or information indicate to acquire data representing a building interior as part of generating panorama images for one or more viewing locations and optionally linking multiple such panorama images, and if not continues to block 490. Otherwise, the routine proceeds to block 412 to receive an indication from a user of a mobile device to begin the image acquisition process at a first viewing location. After block 412, the routine proceeds to block 415 in order to perform a viewing location image acquisition subroutine (with one example of such a routine illustrated in FIG. 4B, as discussed further below) in order to acquire for the viewing location in the interior of the target building of interest.

After block 415 is completed and the corresponding acquired image is received from the subroutine and/or otherwise stored for subsequent use (including in some cases the generated panorama image for that viewing location), the routine continues to block 420 to determine if there are more viewing locations to acquire, such as based on corresponding information provided by the user of the mobile device. If so, and when the user is ready to continue the process, the routine continues to block 422 to initiate the capture of linking information (including acceleration data) during movement of the mobile device along a travel path away from the current viewing location and towards a next viewing location within the building interior. As described elsewhere herein, the captured linking information may include additional sensor data, as well as additional video information, recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next viewing location, and provide one or more guidance cues to the user regarding the motion of the mobile device, quality of the sensor data and/or video information being captured, associated lighting/environmental conditions, advisability of capturing a next viewing location, and any other suitable aspects of capturing the linking information. Similarly, the routine may optionally obtain annotation and/or other information from the user regarding the travel path, such as for later use in presentation of information regarding that travel path or a resulting inter-panorama connection link. In block 424, the routine determines that the mobile device has arrived at the next viewing location (e.g., based on an indication from the user, based on the forward movement of the user stopping for at least a predefined amount of time, etc.), for use as the new current viewing location, and continues to block 415 in order to perform the viewing location image acquisition subroutine.

Figure 4A:
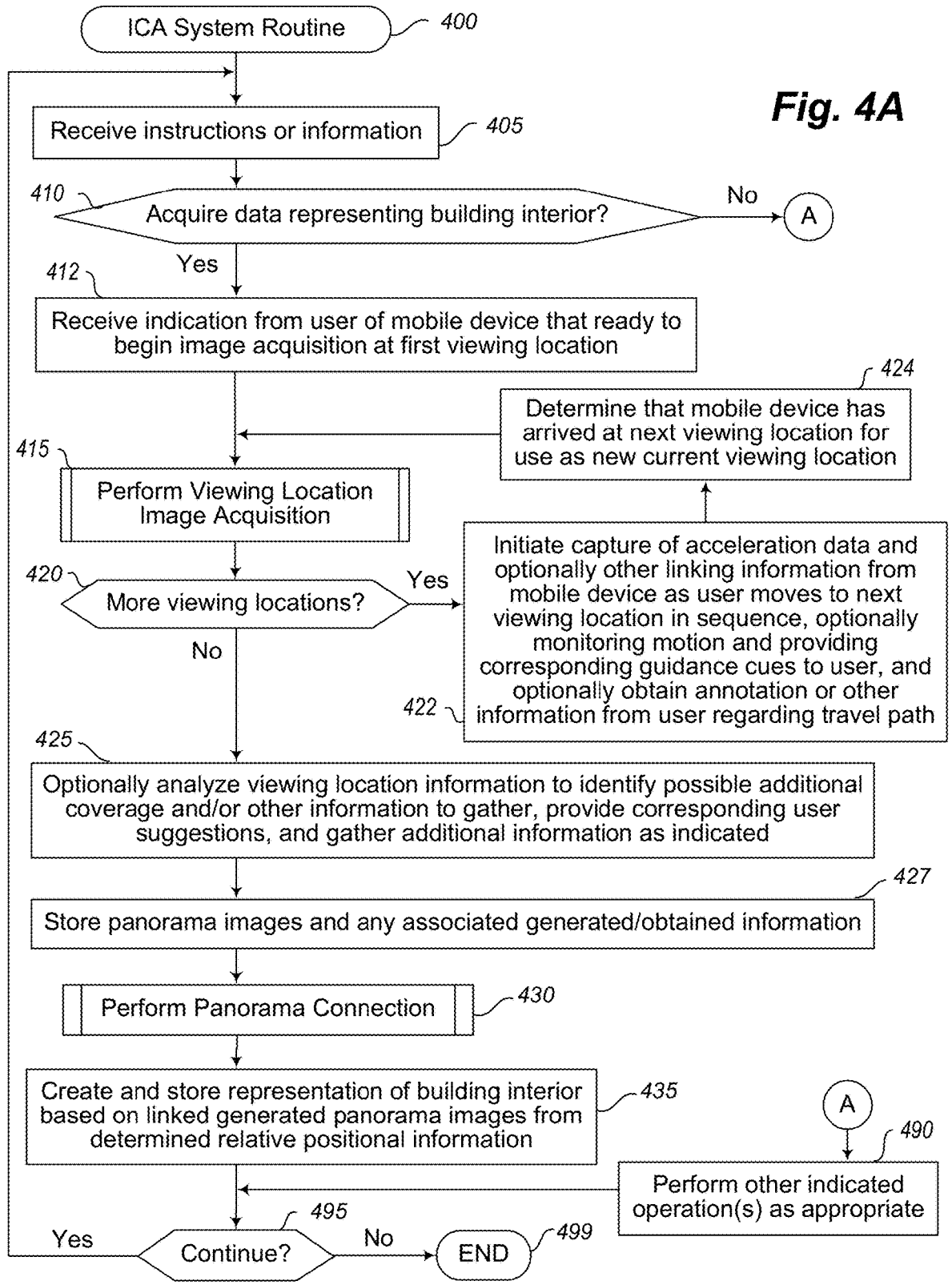
Figure 4B:
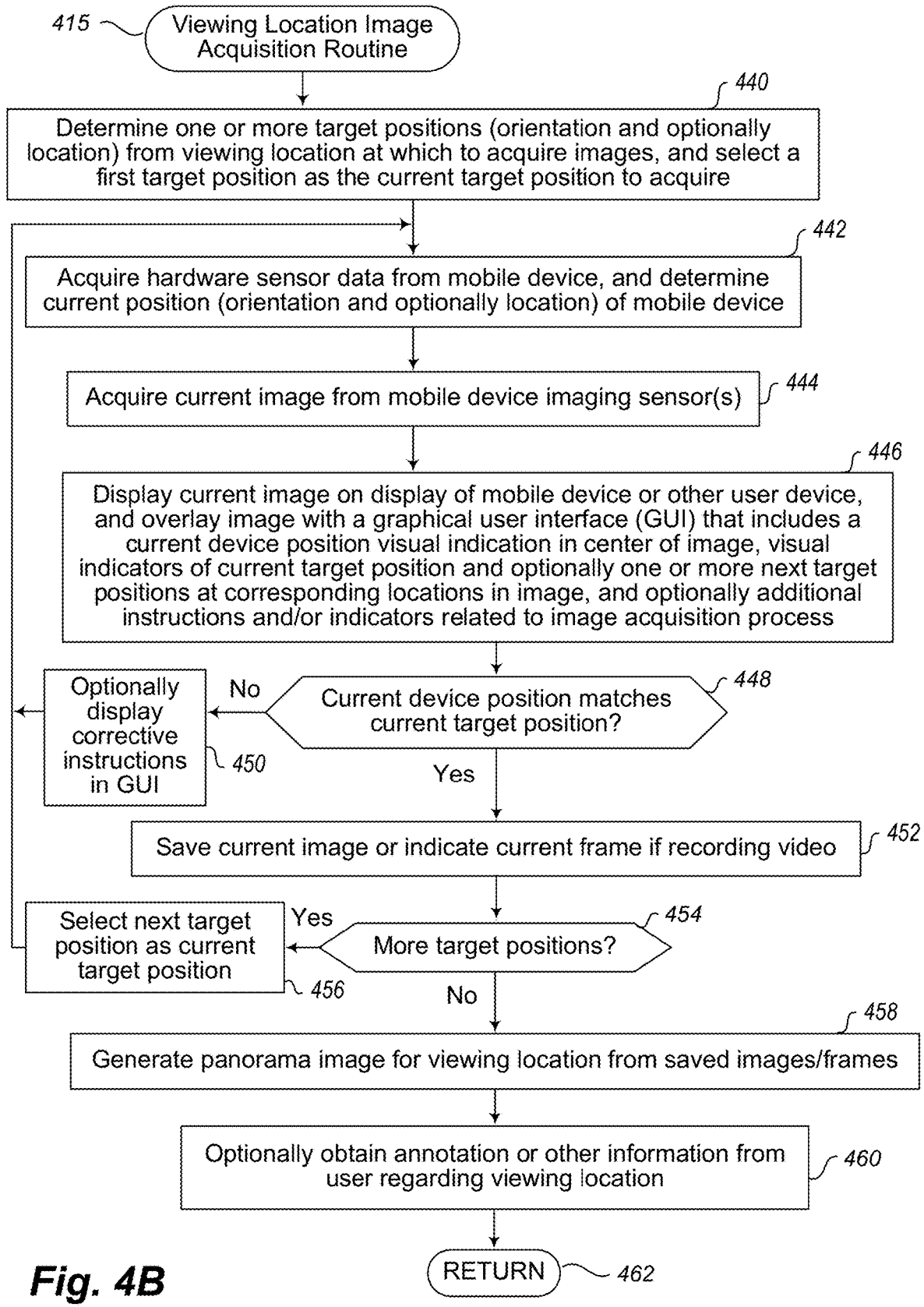

As discussed further in FIG. 4B with respect to performing the viewing location image acquisition subroutine for each viewing location, the routine begins at block 440, where it determines one or more target positions from the current viewing location at which to acquire images (in some cases determining all target positions, such as if they are not dependent on previous images acquired for the viewing location), and with each target position indicating an orientation from the viewing location, and optionally a location translation along x, y and/or z axes relative to the user's body or center of the viewing location. The routine first selects a first such target position as the current target position for which to acquire one or more images, and then continues to perform blocks 442-456 to acquire the images for the target positions at the current viewing location, including using hardware sensor data to display a GUI to guide the image acquisition process.

In particular, in block 442, the routine acquires hardware sensor data from the mobile device, such as from one or more IMU units, and determines a current position of the mobile device, including a current orientation and optionally location. In block 444, the routine then acquires a current image from the mobile device, camera or other imaging sensors. In block 446, the routine then displays the current image on the display of the mobile device (or other device in use by the user), and overlays the displayed image with a displayed GUI that includes a device current position visual indicator in the center of the image, target position visual indicators of each of one or more next target positions at corresponding locations in the image, and optionally additional instructions and/or visual indications related to the image acquisition process. The routine then continues to block 448, where it determines if the current device position matches the current target position for which an image is to be acquired, and if so continues to block 452 to save the current image (or to indicate a current frame if video is being continuously recorded as a user turns at the viewing location). If it is instead determined at block 448 that the current device position does not match the current target position, the routine continues instead to block 450, where it optionally displays corrective instructions in the GUI for the user (e.g., if the current position of the mobile device differs from the current target position in an amount or type that exceeds one or more thresholds). After block 452, the routine continues to block 454, where it determines if there are more target positions for which images are to be acquired for the current viewing location (e.g., based on target positions determined in block 440, based on whether a full 360° turn of the user at the viewing location has occurred, etc.), and if so continues to block 456 to select the next such target position, optionally determining additional target positions if all target positions were not determined in block 440. After blocks 450 or 456, the routine returns to block 442 to repeat the process and continue to acquire images until all target positions have been sufficiently captured.

If it is instead determined at block 454 that images have been acquired at all of the target positions for the current viewing location, the routine continues to block 458, where it generates a panorama image for the viewing location from the saved images or frames, although in other embodiments the panorama images may be later generated after image information is acquired for all viewing locations in a building or other structure. In general, the timing of generating and/or linking particular panorama images may be implemented in any order for such processing may be implemented in accordance with the techniques described herein. For example, the routine may instead process individual segments of captured information sequentially, such that a panorama image is generated for a first viewing location, followed by processing of linking information captured during movement away from that first viewing location to determine relative positional information for a second viewing location; a panorama image generated for the second viewing location, followed by processing of linking information captured during movement away from that second viewing location to determine relative positional information for a third viewing location; etc. In various embodiments, processing of captured information for one or many building interiors may be performed in a parallel and/or distributed manner, such as by utilizing one or more parallel processing computing clusters (e.g., directly by the ICA system or via one or more third-party cloud computing services). After block 458, the routine continues to block 460 where it optionally obtains annotation or other information from the user regarding the viewing location, such as to associate with the generated panorama image for later display to end users in association with the generated panorama image. After block 460, the routine continues to block 462 and returns, such as to proceed to block 420 of FIG. 4A.

Returning to FIG. 4A, and if it is instead determined in block 420 that there are not any more viewing locations at which to acquire image information for the current building or other structure, the routine proceeds to block 425 to optionally analyze the viewing location information for the building or other structure, such as to identify possible additional coverage (and/or other information) to acquire within the building interior. For example, the ICA system may provide one or more notifications to the user regarding the information acquired during capture of the multiple viewing locations and corresponding linking information, such as if it determines that one or more segments of the recorded information are of insufficient or undesirable quality to serve as the basis for generating a panorama image, or do not appear to provide complete coverage of the building, or would provide information for additional inter-panorama links. After block 425, the routine continues to block 427 to store the generated panorama images and any associated generated or obtained information for them, and then to block 430 in order to perform a panorama connection subroutine (with one example of such a routine illustrated in FIGS. 4C and 4D, as discussed further below) in order to generate links between some or all of the panorama images generated for the viewing location.

Figure 4C:
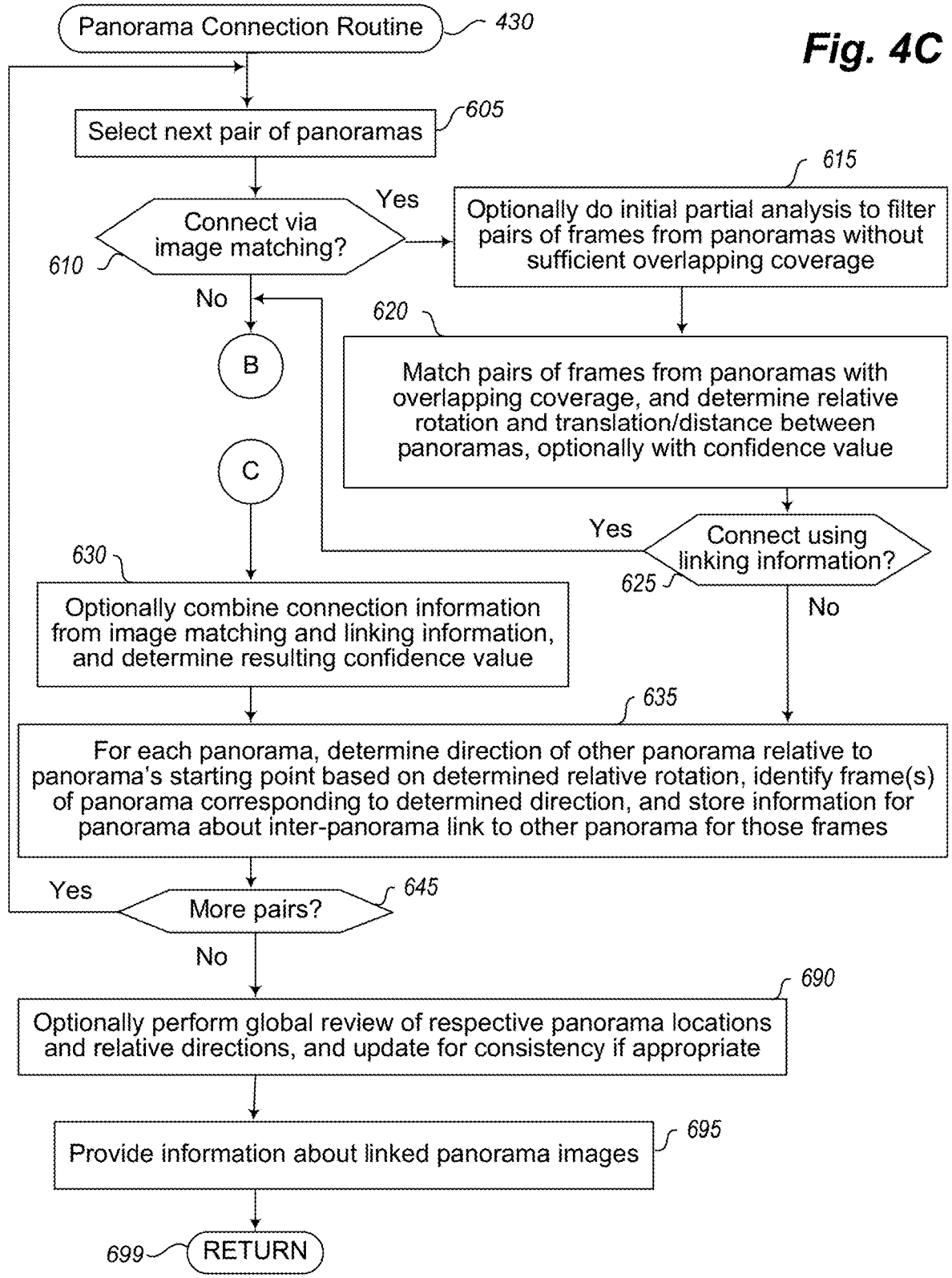

As discussed further in FIGS. 4C and 4D with respect to performing the panorama connection subroutine for the viewing locations of the building or other structure, the routine begins at block 605, where a next pair of panorama images is selected to be analyzed for inter-connection information, beginning with a first pair that includes the first and second panorama images corresponding to the first and second viewing locations in a sequence of multiple viewing locations within a house, building or other structure. The routine then continues to block 610 to determine whether to attempt to determine connection information between the pair of panorama images via image/feature matching, such as based on overlap of features in images/frames from the two panorama images, and if so, continues to block 615. It will be appreciated that in some embodiments, connection determination via image/feature matching may not be performed, such as if all connection information between pairs of panorama images is determined using captured linking information, as discussed in greater detail with respect to blocks 655-670.

In the illustrated embodiment, the routine in block 615 begins by optionally filtering pairs of frames/images from the panorama images (e.g., corresponding to individual frames from a video used to construct the panorama images) that do not have sufficient overlapping coverage, although in other embodiments each image/frame in one of the two panoramas may be compared to each image/frame in the other of the two panorama images to determine an amount of overlap, if any, between the pair of images. In the illustrated embodiment, the routine continues to block 620 from block 615, where it matches non-filtered pairs of frames/images from the two panorama images with overlapping coverage, such as using one or both of essential matrix and/or homography matrix decomposition processing techniques, although other processing techniques may be used in other embodiments. In addition, the routine may optionally select in block 620 whether to retain and use results for each pair from only one of essential matrix processing and homography matrix decomposition processing if both are performed, such as depending on whether information in the pair of frames corresponds to a flat planar surface or instead as information in a 3D space. In other embodiments, results from both essential matrix processing and homography matrix decomposition processing may be retained and used, or instead only one of the two (and possibly other) types of processing may be used. The routine further continues in block 620 to determine relative rotation and translation/distance between the viewing locations for the two panorama images from the results of the one or more processing techniques, optionally by combining results from multiple matching image/frame pairs to determine aggregate consensus inter-panorama connection information, and optionally computing a confidence value in the resulting information.

After block 620, the routine continues to block 625 to determine whether to attempt to also connect the two panorama images via analysis of captured linking information along a travel path that the user took between the viewing locations corresponding to the two panorama images. If so, or if it is instead determined in block 610 to not attempt to connect the two panorama images via image matching, the routine continues to perform blocks 650-670 to use such linking information to determine relative rotation and location/direction/distance between the panorama images. In particular, the routine determines in block 650 whether the two panorama images are consecutive images in the sequence, such that linking information is available for a travel path that the user travels between the two viewing locations corresponding to the two panorama images, and if not continues to block 630. Otherwise, the routine continues to block 655 to obtain that linking information for that travel path, including acceleration data from the mobile device IMU sensor unit(s), and optionally video information as well if available.

After block 655, the routine continues to block 660 to determine the departure direction of leaving the viewing location corresponding to the start panorama image and the arrival direction of arriving at the viewing location of the end panorama image, using video information if available to match initial video information for the departure to one or more corresponding frames of the start panorama image and to match final video information for the arrival to one or more corresponding opposite-side frames of the end panorama image. If video information is not available, leaving and arrival directions may be determined in other manners, such as based solely on analysis of the captured acceleration data and/or other location information for the mobile device. After block 660, the routine continues to block 665 to analyze the acceleration data in the captured linking information along the travel path—in particular, for each acceleration data point, a double integration operation is performed to determine first velocity and then location corresponding to that acceleration data point, including in the illustrated embodiment to determine corresponding velocity and location for each of x, y, and z axes in three dimensions. In block 670, the routine then combines the determined velocity and location for each of the acceleration data points to form a modeled travel path, along with the determined leaving/arriving directions, and uses the resulting information to determine relative rotation and location/distance between the panorama images, optionally with a corresponding confidence value.

After block 670, or if it instead determined in block 650 that the two panorama images do not have captured linking information for a travel path between them, the routine continues to block 630 to, if connection information is available from both image matching and linking information, combine the information into a final determined aggregate relative direction and distance/location for the panorama images, along with the resulting confidence value from the combination. After block 630, or if it is instead determined in block 625 to not use linking information to connect the two panorama images, the routine continues to block 635 to, for each panorama in the pair and based on the determined relative position information, determine a direction of the other panorama relative to the current panorama starting point, identify one or more frames in the current panorama that correspond to that determined direction, and store information for the current panorama about an inter-panorama link to the other panorama for those one or more frames.

After block 635, the routine continues to block 645 to determine whether there are more pairs of panorama images to analyze, and if so, returns to block 605 to select the next such pair. In some embodiments, each consecutive pair of panorama images in the sequence of viewing locations is analyzed, and then some or all other pairs of panorama images that do not have corresponding linking information based on a travel path between those viewing locations are considered, so as to determine and provide inter-panorama connection information for all pairs of panorama images for which information is available. As discussed in greater detail elsewhere herein, in some embodiments, some links between pairs of panoramas may not be provided even if they may be calculated, however, such as to provide inter-panorama links upon display to an end user only for a subset of panorama pairs (e.g., corresponding to panorama pairs that are visible to each other, or near each other within a defined distance, or otherwise satisfy one or more specified criteria).

If it is instead determined in block 645 that there are no more pairs of panorama images to consider, the routine continues to block 690 to optionally perform a global review of the respective panorama locations and the relative directions between them for overall consistency, and to update that determined information as appropriate, as discussed in greater detail elsewhere. If so, such an update may include updating the stored information for one or more panoramas about one or more inter-panorama links from that panorama to one or more other panoramas. After block 690, the routine continues to block 695 to provide information about the determined linked panorama images, and continues to block 699 and returns to block 435 of FIG. 4A, including to provide the information about the determined linked panorama images.

Figure 5A:
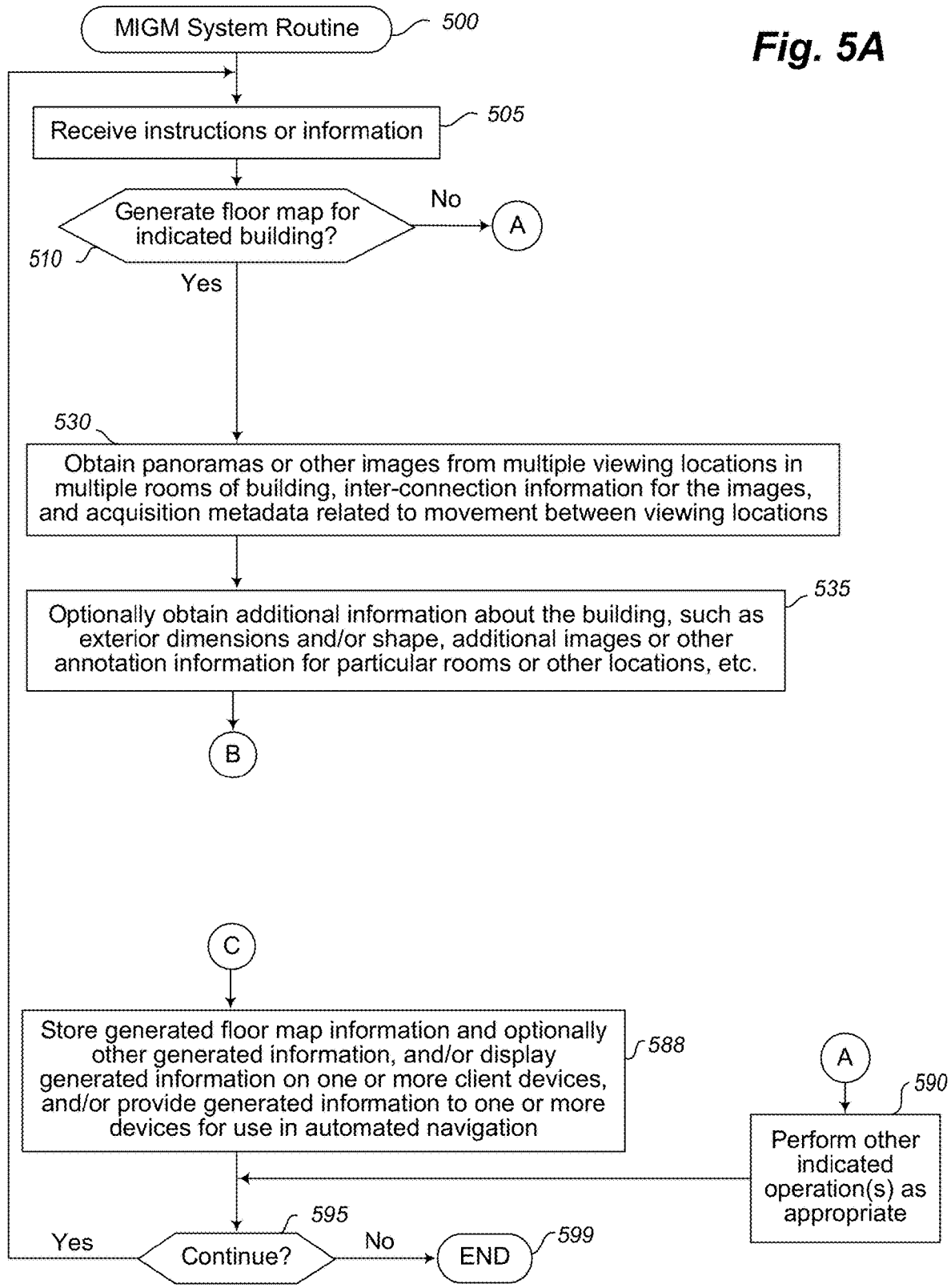

Returning to FIG. 4A, and after block 430, the routine proceeds to block 435 to store the generated information for the building or other structure, including to optionally create and store one or more additional representations of the building interior, such as by invoking one or more corresponding subroutine. FIGS. 5A-5B illustrate one example of a routine for generating a floor map representation of such a building interior from the generated and linked panorama information.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, a user representing an operator of the system, etc.), to obtain and store other information about users of the system, to respond to requests for generated and stored information, etc.

Following blocks 435 or 490, the routine proceeds to block 495 to determine whether to continue, such as until an explicit indication to terminate is received. If it is determined to continue, the routine returns to block 405 to await additional instructions or information, and if not proceeds to step 499 and ends.

FIGS. 5A-5B illustrate an example embodiment of a flow diagram for a Mapping Information Generation Manager (MIGM) System routine 500. The routine may be performed by, for example, execution of the MIGM system 140 of FIG. 1A, the MIGM system 389 of FIG. 3, and/or an MIGM system as described elsewhere herein, such as to generate and use mapping information for a defined area based at least in part on interconnected images of the area. In the example of FIGS. 5A-5B, the generated mapping information includes a floor map of a building, such as a house, but in other embodiments, other types of mapping information may be determined and generated for other types of buildings and used in other manners, as discussed elsewhere herein.

The illustrated embodiment of the routine begins at block 505, where information or instructions are received. The routine continues to block 510 to determine whether the instructions received in block 505 indicate to generate a floor map for an indicated building, optionally along with associated information about the building, and if so the routine continues to perform blocks 530-588 to do so, and otherwise continues to block 590.

In block 530, the routine obtains existing panoramas or other images from multiple viewing locations in multiple rooms of the building, along with interconnection information for the images and acquisition of metadata information related to movement between the viewing locations, such as may optionally be supplied in block 505 along with the corresponding instructions. After block 530, the routine continues to block 535 to optionally obtain additional information about the building, such as from one or more external sources (e.g., online databases, information provided by one or more users, etc.)—such additional information may include, for example, exterior dimensions and/or shape of the building, additional images and/or annotation information acquired corresponding to particular locations within the building (optionally for locations different from viewing locations of the acquired panorama or other images), etc.

After block 535, the routine continues to block 540 to use the obtained or acquired image and inner-connection information to determine, for the viewing locations of images inside the building, relative global positions of the viewing locations in a common coordinate system or other common frame of reference, such as to determine directions and optionally distances between the respective viewing locations. After block 540, the routine in block 550 analyzes the acquired or obtained panoramas or other images to determine, for each room in the building that has one or more viewing locations, a position within the room of those viewing locations. In block 555, the routine further analyzes the images and/or the acquisition metadata for them to determine, for each room in the building, any connecting passages in or out of the room. In block 560, the routine then receives or determines estimated room shape information and optionally room type information for some or all rooms in the building, such as based on analysis of images, information supplied by one or more users, etc. It will be appreciated that, while blocks 550-560, are illustrated in separate operations, in some embodiments a single analysis of the images may be performed to acquire or determine multiple types of information, such as those discussed with respect to blocks 550-560.

In block 565, the routine then separately positions each room shape for each room around the viewing locations of any images in the room using the previously determined relative global position information for the viewing locations, in order to determine initial estimated positions of the room shapes. In block 570, the routine then generates final positions of each room to create a resulting floor map, including matching connecting passages between rooms and optionally applying other constraints from one or more of the obtained additional building information, room shapes and/or room types, other information from the analysis of the images and/or their acquisition metadata, etc. Such a floor map may include, for example, relative position and shape information for the various rooms without providing any actual dimension information for the individual rooms or building as a whole, and may further include multiple linked or associated sub-maps (e.g., to reflect different stories, levels, sections, etc.) of the building.

After block 570, the routine optionally performs one or more steps 575 through 585 to determine and associate additional information with the floor map. In block 575, the routine optionally estimates the dimensions of some or all of the rooms, such as from analysis of images and/or their acquisition metadata or from overall dimension information obtained for the exterior of the building, and associates the estimated dimensions with the floor map—it will be appreciated that if sufficiently detailed dimension information were available, a floor plan may be generated from the floor map. After block 575, the routine continues to block 580 to optionally associate further information with the floor map, such as additional images and/or annotation information, and with particular rooms or other locations within the building. In block 585, the routine further optionally estimates heights of some or all rooms, such as from analysis of images and optionally sizes of known objects in the images, as well as height information about a camera when the images were acquired, and further uses such information to generate a 3D model of the building, with the 3D model further associated with the floor map.

After block 585, the routine continues to block 588 to store and/or otherwise use the generated floor map information and optionally other generated information, such as to provide the generated information for display on one or more client devices, provide that generated information to one or more other devices for use in automating navigation of those devices and/or associated vehicles or other entities, etc.

If it is instead determined in block 510 that the information or instructions received in block 505 are not to generate a floor map for an indicated building, the routine continues instead to block 590 to perform one or more other indicated operations as appropriate. Such other operations may include, for example, receiving and responding to requests for previously generated floor maps and/or other generated information (e.g., requests for such information for display on one or more client devices and/or to provide to one or more other devices for use in automated navigation), obtaining and storing information about buildings for use in later floor map generation operations (e.g., information about exterior images, dimensions, numbers or types of rooms, total square footage, etc.), etc.

After blocks 588 or 590, the routine continues to block 595 to determine whether to continue, such as until an explicit indication to terminate is received. If it is determined to continue, the routine returns to block 505 to wait for and receive additional instructions or information, and otherwise continues to block 599 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   determining, by a mobile computing device at a viewing location within a room, a series of target directions from the viewing location to use in acquiring multiple images for use in a composite panorama image of an interior of the room, wherein each of the target directions includes a target geometric orientation in three-dimensional space that includes values for rotation for each of tilt, swivel and pivot of the mobile computing device along three degrees of freedom;
   acquiring, from a camera on the mobile computing device, the multiple images, including, for each successive target direction in the series:
      determining a current direction of the camera from the viewing location based at least in part on analyzing data from one or more inertial measurement unit (IMU) sensors in the mobile computing device, wherein the current direction includes a current geometric orientation in three-dimensional space that includes values for rotation for each of tilt, swivel and pivot of the mobile computing device along three degrees of freedom;
      displaying information on the mobile computing device, including a view currently visible from the camera in the current direction, and a current direction visual indicator overlaid in a center of the view to represent the mobile computing device, and a target direction visual indicator overlaid at a position in the view to identify the successive target direction in the series, wherein the position of the target direction visual indicator in the view is offset from the center of the view in an amount corresponding to a difference between the successive target direction and the determined current direction;
      repeatedly updating the displayed information as camera direction changes until the current direction visual indicator matches the target direction visual indicator, including updating the view being displayed to reflect a changing view that is visible from the camera, and updating relative positions of the current direction and target direction visual indicators to reduce the difference based on the changes in the camera direction;
      recording, by the camera, video during the displaying of the information and the updating of the displayed information; and
      acquiring, from the camera and while the current direction visual indicator matches the target direction visual indicator, one of the multiple images that is in the successive target direction from the viewing location, including storing, by the mobile computing device and without corresponding instructions from a user moving the mobile computing device, information about one or more current frames of the video at a time of the current direction visual indicator matching the target direction visual indicator;
   generating, by the mobile computing device and from the acquired multiple images, the composite panorama image to represent the interior of the room; and
   displaying the composite panorama image to one or more users.

2. The computer-implemented method of claim 1 wherein the acquiring of the multiple images occurs while a user turns the mobile computing device in a 360 degree circle at the viewing location, wherein the one or more users are using client computing systems remote from the mobile computing device and are different from the user, wherein displaying of the current direction visual indicator includes displaying a rectangular visual element that represents the mobile computing device, wherein displaying of the target direction visual indicator for a successive target direction includes displaying an additional rectangular visual element, and wherein the method further comprises determining, by the mobile computing device, that the current direction visual indicator matches the target direction visual indicator when one of the displayed rectangular visual element and the displayed additional rectangular visual element fully overlaps the other of the displayed rectangular visual element and the displayed additional rectangular visual element.

3. A computer-implemented method comprising:
   determining, for a mobile device at a viewing location within a room, a series of target directions from the viewing location to use in acquiring multiple images that capture at least some of an interior of the room;
   determining, by the mobile device, a current direction of a camera of the mobile device based at least in part on data from one or more inertial measurement unit (IMU) sensors in the mobile device;
   identifying, by the mobile device, one or more differences between the current direction of the camera and one or more of the target directions;
   displaying, on the mobile device, information including a view from the camera in the current direction, and a current direction visual indicator in a center of the displayed view that represents the current direction of the camera, and one or more target direction visual indicators to represent the one or more target directions and that are at locations in the displayed view differing from the center of the displayed view by amounts corresponding to the determined one or more differences;
   updating, by the mobile device, and until the current direction visual indicator matches one of the target direction visual indicators, the displayed information as a direction of the camera changes, including displaying a changing view from the camera, and maintaining the current direction visual indicator in a center of the displayed changing view, and updating the positions in the displayed changing view of the one or more target direction visual indicators, to enable a visual determination of changing differences from the one or more target directions to a current direction;
   recording, by the camera, video during the displaying of the information and the updating of the displayed information; and
   acquiring, by the camera and while the current direction visual indicator matches the one target direction visual indicator, one of the multiple images in one of the one or more target directions that is represented by the one target direction visual indicator, including storing, by the mobile device and without corresponding instructions from a user moving the mobile device, information about one or more current frames of the video at a time of the current direction visual indicator matching the one target direction visual indicator.

4. The computer-implemented method of claim 3 further comprising, after the acquiring of the one image in the one target direction, further acquiring images by the mobile device for each of the target directions of the series other than the one target direction, including repeatedly performing the determining of the current direction and the identifying and updating and the acquiring until the images are acquired for each of the target directions of the series other than the one target direction.

5. The computer-implemented method of claim 4 further comprising, after the acquiring of the image for the one target direction and the further acquiring of the images for each of the target directions of the series other than the one target direction, using at least some acquired images for target directions to generate a panorama image that provides a 360-degree view around a vertical axis from the viewing location.

6. A computer-implemented method comprising:
   determining, for a mobile device at a viewing location within a room, a series of target directions from the viewing location to use in acquiring multiple images that capture at least some of an interior of the room;
   determining, by the mobile device, a current direction of a camera of the mobile device based at least in part on data from one or more inertial measurement unit (IMU) sensors in the mobile device;
   identifying, by the mobile device, one or more differences between the current direction of the camera and one or more of the target directions;
   displaying, on the mobile device, information including a view from the camera in the current direction, and a current direction visual indicator in a center of the displayed view that represents the current direction of the camera, and one or more target direction visual indicators to represent the one or more target directions and that are at locations in the displayed view differing from the center of the displayed view by amounts corresponding to the determined one or more differences;
   updating, by the mobile device, and until the current direction visual indicator matches one of the target direction visual indicators, the displayed information as a direction of the camera changes, including displaying a changing view from the camera, and maintaining the current direction visual indicator in a center of the displayed changing view, and updating the positions in the displayed changing view of the one or more target direction visual indicators, to enable a visual determination of changing differences from the one or more target directions to a current direction;
   acquiring, by the camera and while the current direction visual indicator matches the one target direction visual indicator, one of the multiple images in one of the one or more target directions that is represented by the one target direction visual indicator;
   after the acquiring of the one image in the one target direction, further acquiring images by the mobile device for each of the target directions of the series other than the one target direction, including repeatedly performing the determining of the current direction and the identifying and updating and the acquiring until the images are acquired for each of the target directions of the series other than the one target direction;
   after the acquiring of the image for the one target direction and the further acquiring of the images for each of the target directions of the series other than the one target direction, using at least some acquired images for target directions to generate a panorama image that provides a 360-degree view around a vertical axis from the viewing location;
   for each of multiple additional viewing locations in additional rooms of a building that includes the room, acquiring images from multiple target directions from the additional viewing location, including repeatedly performing, for the additional viewing location, the determining of the current direction and the identifying and updating and the acquiring until the images are acquired for each of the multiple target directions;
   generating, for each of the multiple additional viewing locations, a panorama image for the additional viewing location that is based at least in part on the acquired images for the multiple target directions from the additional viewing location;
   generating, by at least one computing device, linking information between at least some pairs of generated panorama images that includes determining a direction between the generated panorama images of the pair; and
   displaying, by the at least one computing device and to a user, multiple of the generated panorama images, including changing displayed information from one generated panorama image to another panorama image based on user instructions using displayed visual representations of the generated linking information.

7. The computer-implemented method of claim 6 further comprising:
   generating, by the at least one computing device, a floor map of the building by analyzing the generated linking information and the generated panorama images for the viewing location and the multiple additional viewing locations; and
   displaying, by the at least one computing device and to the user, the generated floor map of the building in response to instructions from the user.

8. The computer-implemented method of claim 7 wherein the mobile device is a handheld smartphone device, and wherein the at least one computing device is the smartphone device.

9. The computer-implemented method of claim 3 wherein the determining of the series of target directions includes determining, by at least one computing device and for each of the target directions of the series, a target geometric orientation in three-dimensional space that includes values for rotation for each of tilt, swivel and pivot to correspond to three degrees of freedom, wherein the determining of the current direction of the camera includes determining a current geometric orientation of the camera in the three-dimensional space that includes values for rotation for each of tilt, swivel and pivot to correspond to the three degrees of freedom, and wherein the displaying of the one or more target direction visual indicators includes visually representing the determined target geometric orientation of each of the one or more target direction visual indicators relative to the determined current geometric orientation of the camera.

10. The computer-implemented method of claim 9 wherein the determining of the current direction of the camera further includes using the view from the camera in the current direction to determine a current location of the camera in the three-dimensional space that includes values of translation for each of three perpendicular axes of direction to correspond to three additional degrees of freedom, wherein the determining of the series of target directions includes determining a target location of each of the target directions in the three-dimensional space that includes values of translation for each of the three perpendicular axes of direction, and wherein the displaying of the one or more target direction visual indicators includes visually representing the determined target location of each of the one or more target direction visual indicators relative to the determined current location of the camera.

11. The computer-implemented method of claim 3 wherein the displaying of the current direction visual indicator includes displaying a rectangular visual element that represents the mobile device, wherein the displaying of the one or more target direction visual indicators includes displaying an additional rectangular visual element for each of the one or more target direction visual indicators that represents a different direction of the mobile device, and wherein the method further comprises determining, by the mobile device, that the current direction visual indicator matches the one target direction visual indicator when the displayed rectangular visual element and the displayed additional rectangular visual element of the one target direction visual indicator overlap each other at least in part.

12. The computer-implemented method of claim 3 wherein the displaying of the current direction visual indicator includes displaying a rectangular visual element that represents the mobile device, wherein the displaying of the one or more target direction visual indicators includes displaying an additional rectangular visual element for each of the one or more target direction visual indicators that represents a different direction of the mobile device, and wherein the method further comprises determining, by the mobile device, that the current direction visual indicator matches the one target direction visual indicator when one of the displayed rectangular visual element and the displayed additional rectangular visual element of the one target direction visual indicator fully overlaps the other of the displayed rectangular visual element and the displayed additional rectangular visual element of the one target direction visual indicator.

13. The computer-implemented method of claim 3 wherein the displaying of the current direction visual indicator includes determining a line in the view from the camera in the current direction that corresponds to a level horizontal portion of the room, and displaying at least a horizon line to represent the current direction of the mobile device relative to the level horizontal portion of the room.

14. The computer-implemented method of claim 3 wherein the displaying of the one or more target direction visual indicators includes displaying upper and lower boundaries for each of the one or more target direction visual indicators, and wherein the method further comprises determining, by the mobile device, that the current direction visual indicator matches the one target direction visual indicator when the displayed current direction visual element indicator is between the upper and lower boundaries for the one target direction visual indicator.

15. The computer-implemented method of claim 3 further comprising, after the acquiring of the one image in the one target direction, further updating, by the mobile device, the displayed information to change a visual appearance of the one target direction visual indicator to illustrate that an image has been acquired in the one target direction visual indicator.

16. The computer-implemented method of claim 15 further comprising determining, by the mobile device, one of multiple degrees to which the acquired one image satisfies one or more defined criteria, and wherein the further updating of the displayed information includes adding information to the changed visual appearance of the one target direction visual indicator to visually represent the determined one degree.

17. The computer-implemented method of claim 15 further comprising determining, by the mobile device, a characteristic of the acquired one image from multiple possible characteristics, and wherein the further updating of the displayed information includes adding information to the changed visual appearance of the one target direction visual indicator to visually represent the determined characteristic.

18. The computer-implemented method of claim 6 wherein the acquiring by the camera of the one image includes saving, by the mobile device and without corresponding instructions from a user moving the mobile device, a current view available from the camera as the one image.

19. The computer-implemented method of claim 3 wherein the displaying of the information and the updating of the displayed information includes overlaying the current direction visual indicator and the one or more target direction visual indicators on the view and the changing view from the camera, and further includes displaying information to guide a user who is moving the mobile device in matching the current direction visual indicator and the one target direction visual indicator.

20. A non-transitory computer-readable medium having stored contents that cause one or more computing devices to perform automated operations including at least:
  determining, by the one or more computing devices, multiple target directions from a viewing location to use in acquiring multiple images for generating a panorama image from the viewing location;
  determining, by the one or more computing devices, a current direction of a camera at the viewing location based at least in part on data from one or more sensors associated with the camera, and one or more differences between the current direction and one or more target directions of the multiple target directions;
  displaying a view visible from the camera, and an overlaid visual indicator of a center of the displayed view, and one or more overlaid target direction visual indicators that represent the one or more target directions and that are at positions in the displayed view corresponding to the determined one or more differences;
  updating, as camera direction changes, and until one of the target direction visual indicators is at the center of the displayed view, the displayed view visible from the camera and the positions in the displayed view of the one or more target direction visual indicators;
  recording, by the camera, video during the displaying of the view and the updating of the displayed view; and
  acquiring, by the camera and while the one target direction visual indicator is at the center of the displayed view, one of the multiple images in the target direction that is represented by the one target direction visual indicator, including storing, by the one or more computing devices and without corresponding instructions from a user, information about one or more current frames of the video at a time of the one target direction visual indicator being at the center of the displayed view.

21. The non-transitory computer-readable medium of claim 20 wherein the one or more computing devices include a mobile computing device that contains the camera, wherein the one or more sensors associated with the camera include multiple hardware sensors on the mobile computing device that are part of one or more inertial measurement units, and wherein the displaying of the overlaid visual indicator of the center of the displayed view includes displaying a current direction visual indicator at the center that represents the mobile computing device.

22. The non-transitory computer-readable medium of claim 20 wherein the displaying of the overlaid visual indicator of the center of the displayed view includes displaying horizontal and vertical lines that intersect at the center of the displayed view, and the displaying of the one or more overlaid target direction visual indicators that represent the one or more target directions further includes displaying the one or more overlaid target direction visual indicators to each have a rotation for one or more of tilt, swivel and pivot that represents current tilt, swivel and pivot of a device containing the camera, and wherein the automated operations further include determining to perform the acquiring of the one image based at least in part on the rotation of the one target direction visual indicator for the one or more of tilt, swivel and pivot matching the horizontal and vertical lines.

23. The non-transitory computer-readable medium of claim 20 wherein the displaying of the one or more overlaid target direction visual indicators that represent the one or more target directions further includes displaying upper and lower boundaries, and wherein the automated operations further include determining to perform the acquiring of the one image based at least in part on the one target direction visual indicator being within the upper and lower boundaries.

24. A system comprising:
one or more hardware processors of one or more computing devices; and
one or more memories with stored instructions that, when executed by at least one of the one or more hardware processors, cause at least one of the one or more computing devices to perform automated operations including at least:
determining multiple target directions from a viewing location to use in acquiring multiple images from the viewing location;
determining a current direction of a camera at the viewing location based at least in part on data from one or more inertial measurement unit (IMU) sensors associated with the camera;
displaying a view visible from the camera and repeatedly updating the displayed view as the current direction of the camera changes, including overlaying one or more target direction visual indicators on the displayed view that represent one or more target directions of the multiple target directions and that are at changing positions in the displayed view from the updating corresponding to changing differences between the current direction and one or more target directions;
recording, by the camera, video during the displaying of the view and the updating of the displayed view; and
acquiring, by the camera and while one of the one or more target direction visual indicators is at a center of the displayed view, one of the multiple images in the target direction that is represented by the one target direction visual indicator, including storing, without corresponding instructions from a user, information about one or more current frames of the video at a time of the one target direction visual indicator being at the center of the displayed view.

25. The system of claim 24 wherein the one or more computing devices include a mobile computing device that contains the camera, wherein the displaying of the view and the repeated updating of the displayed view includes overlaying on the displayed view at least one current direction visual indicator representing the current direction of the camera, and wherein the automated operations further include determining to perform the acquiring of the one image based at least in part on the at least one current direction visual indicator matching the one target direction visual indicator.

* * * * *